United States Patent
Devaraju et al.

(10) Patent No.: US 10,609,174 B2
(45) Date of Patent: Mar. 31, 2020

(54) PARALLEL PREFETCHING LOG/META STREAM SUB-PORTIONS TO RECREATE PARTITION STATES IN A DISTRIBUTED COMPUTING SYSTEM

(71) Applicant: Microsoft Technology Licensing, LLC, Redmond, WA (US)

(72) Inventors: Jegan Devaraju, Redmond, WA (US); Yongfu Lou, Redmond, WA (US); Maneesh Sah, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 441 days.

(21) Appl. No.: 15/484,778

(22) Filed: Apr. 11, 2017

(65) Prior Publication Data

US 2018/0295206 A1 Oct. 11, 2018

(51) Int. Cl.
*H04L 29/08* (2006.01)
*H04L 12/26* (2006.01)
*H04L 29/06* (2006.01)

(52) U.S. Cl.
CPC .......... *H04L 67/2847* (2013.01); *H04L 43/08* (2013.01); *H04L 67/10* (2013.01); *H04L 67/38* (2013.01)

(58) Field of Classification Search
CPC ...... H04L 67/2847; H04L 67/10; H04L 43/08
See application file for complete search history.

(56) References Cited

U.S. PATENT DOCUMENTS

| | | |
|---|---|---|
| 7,181,574 B1 | 2/2007 | Lele |
| 8,725,687 B2 | 5/2014 | Klose |

(Continued)

FOREIGN PATENT DOCUMENTS

WO 2012142820 A1 10/2012

OTHER PUBLICATIONS

Gonzalez-Beltran, et al., "Range queries over skip tree graphs", In Journal of Computer Communications, vol. 31, Issue 2, Feb. 2008, pp. 358-374.
Zhang, et al., "Reducing the Storage Overhead of Main-Memory OLTP Databases with Hybrid Indexes", In Proceedings of the International Conference on Management of Data, Jun. 26, 2016, pp. 1567-1581.

(Continued)

*Primary Examiner* — Shean Tokuta
*Assistant Examiner* — Juan C Turriate Gastulo
(74) *Attorney, Agent, or Firm* — Newport IP, LLC; Mike R. Cicero

(57) ABSTRACT

Prefetching metadata stream sub-portions and/or log stream sub-portions to recreate partition states in a distributed computing system. A system monitors performance metrics associated with a first node running an instance of a partition and, based thereon, cause a second node to duplicate a desired operational state of the partition. The desired operational state may result from transactions being performed on the partition after a previous operational state. Re-creating the desired operational state may include causing multiple prefetch buffers to simultaneously load sub-portions of the transactions and then commencing a replay operation after an initial subset of the transactions is loaded but prior to the entirety of the transactions being fully loaded. The system may preemptively analyze individual prefetch buffers to identify partial buffers that have not fully loaded. Then, the system may cause other prefetch buffers to assist the partial buffers in fully loading a corresponding subset of transactions.

20 Claims, 6 Drawing Sheets

(56) References Cited

U.S. PATENT DOCUMENTS

| | | | |
|---|---|---|---|
| 8,886,796 | B2 | 11/2014 | Calder et al. |
| 9,087,012 | B1* | 7/2015 | Hayes ................. G06F 11/2094 |
| 9,256,383 | B2 | 2/2016 | De Spiegeleer et al. |
| 9,519,551 | B2 | 12/2016 | Larson et al. |
| 2014/0237172 | A1* | 8/2014 | Shah ....................... G06F 9/466 711/103 |
| 2014/0258499 | A9* | 9/2014 | Calder ................ H04L 67/1002 709/224 |
| 2015/0242263 | A1* | 8/2015 | Klose .................... G06Q 10/06 714/47.3 |
| 2015/0254264 | A1* | 9/2015 | Yu ....................... G06F 11/1469 707/674 |
| 2015/0278281 | A1 | 10/2015 | Zhang |
| 2016/0173599 | A1 | 6/2016 | Chablani et al. |
| 2017/0139832 | A1* | 5/2017 | Gupta ................. G06F 12/0855 |

OTHER PUBLICATIONS

He, et al., "Dynamic multidimensional index for large-scale cloud data", In Journal of Cloud Computing Advances, Systems and Applications, Jul. 15, 2016, pp. 1-11.

Liao, et al., "Performing Initiative Data Prefetching in Distributed File Systems for Cloud Computing", In Journal of IEEE Transactions on Cloud Computing, Mar. 27, 2015, pp. 1-14.

Sprenger, et al., "Cache-Sensitive Skip List: Efficient Range Queries on modern CPUs", https://www2.informatik.hu-berlin.de/~sprengsz/papers/cssl.pdf, Retrieved on: Feb. 2, 2017, 16 pages.

\* cited by examiner

300 MB worth of the $P_5$ Transaction Data ($LS_5$)

PARALLEL PREFETCHING LOG/META STREAM SUB-PORTIONS TO RECREATE PARTITION STATES IN A DISTRIBUTED COMPUTING SYSTEM

BACKGROUND

Distributed computing systems can be configured to simultaneously deploy numerous partitions across numerous different computing nodes. Various circumstances may result in a particular partition that is operating on a particular computing node being moved to a different computing node. More specifically, the particular partition may be loaded onto the different computing node and may then be transformed into the same operational state that it was previously in on the particular computing node it was moved from. Transforming the particular partition into the desired operational state typically involves (1) sequentially reading all the records in the metadata stream, and (2) sequentially replaying numerous transactions that have, in the aggregate, resulted in the desired operational state and that have been recorded in one or more log streams. Therefore, the time it takes to load a partition and return it to a desired operational state is partially dependent on an amount of time spent reading the metadata stream and the one or more log streams before commencing a replay operation of the numerous transactions.

Minimizing the duration of partition loading is important for maximizing a distributed computing system's load-balancing efficiencies and its availability of service. In particular, while a particular partition is being loaded onto a computing node, that particular partition may be unavailable to service transaction requests from one or more applications that the particular partition is supporting. Accordingly, accelerating the rate at which the metadata stream and the one or more log streams are read may be helpful in reducing the duration of partition loading and, ultimately, in maximizing load-balancing efficiency and availability of service of a distributed computing system.

It is with respect to these considerations and others that the disclosure made herein is presented.

SUMMARY

Technologies are described herein for prefetching sub-portions of metadata streams and/or log streams to recreate partition states in a distributed computing system. Generally described, configurations disclosed herein enable a system to monitor performance metrics associated with a first computing node (may be referred to herein as a "node") that is operating a partition in a particular operational state and, based on the performance metrics, cause a second node to recreate the partition in the particular operational state.

As used herein, an "operational state" of a partition may refer generally to a plurality of specific states of one or more data objects of the partition. For example, a particular data object may designate a color for a particular graphical element of an application associated with the partition, e.g. a sword element of a virtual gaming environment being at least partially supported by the partition. Since the particular operational state may result from a plurality of transactions being performed with respect to the partition (and/or individual data objects thereof) subsequent to a previous operational state, re-creating the partition may include causing the partition to enter the previous operational state and then sequentially replaying the plurality of transactions. To enable subsequent replaying of the plurality of transactions, the distributed computing system may record the transactions in one or both of a metadata stream and a log stream associated with the partition. During a replay operation, the transactions may be replayed in their original order to ensure that the desired operational state of the partition is precisely duplicated. The plurality of transactions may be read from one or both of the metadata stream or the log stream of transactions and, once read, loaded into a buffer from which the transactions are replayed to the partition in their original order. Waiting for a large number of transactions to load before commencing the replay operation, however, increases the duration of partition loading which negatively impacts a distributed computing system's load-balancing efficiency and its availability of service. As used herein, a "partition" may refer generally to an instance of a virtual machine, an application container, and/or a physical machine that is configured to provide an individualized computing environment to support the resources and/or operating systems specific to one or more specific service applications and/or an individual service application.

Accordingly, causing a plurality of prefetch buffers to simultaneously load (e.g., in parallel) sub-portions of the plurality of transactions and then commencing the replay operation after an initial subset of the transactions is loaded provides benefits over waiting for the entirety of the transactions to fully load prior to commencing the replay operation. For illustrative purposes, consider a scenario where the plurality of transactions associated with a particular replay operation has grown in size to include three-hundred megabytes (MB) of transaction data on the metadata stream and another three-hundred MB of transaction data on the log stream. Further consider that the metadata stream and/or log stream of transactions can be read at a rate of four MB per second (MBPS). Under these circumstances, waiting for the entire three-hundred MB of transaction data to load, from each of the metadata stream and the log stream, prior to commencing the replay operation would result in a loading delay of seventy-five seconds for each stream. In contrast, splitting each stream's three-hundred MB of transaction data into a plurality of four MB sub-portions and commencing the replay operation upon an initial sub-portion being fully loaded onto an individual prefetch buffer results in a loading delay of only one second before the replay operation can be commenced from each of the metadata stream and the log stream.

Furthermore, deploying an appropriate number of prefetch buffers to simultaneously load multiple individual sub-portions results in a stream read position remaining ahead of a record processing position (e.g. a log stream position corresponding to a transaction that is currently being replayed to the new instance of the partition). For example, further suppose that the system includes sixteen individual prefetch buffers each capable of reading a particular stream of transactions (e.g. either the metadata stream or the log stream) at the four MBPS rate. Under these circumstances, if each of these sixteen individual prefetch buffers is instructed to read a corresponding four MB sub-portion at the outset of a read operation, then after the first one-second of the read operation, the system will have pre-fetched the first sixty-four MB of the three-hundred MB of transaction data. Then, upon the initial four MB sub-portion being replayed, it's corresponding prefetch buffer may be instructed to begin loading and another four MB sub-portion that corresponds to a range of transactions from the sixty-fourth MB of the transaction data to the sixty-eighth MB of the transaction data. Stated alternatively, under these circumstances, the design parameters of the system would cause the stream read position to lead the record processing position by roughly sixty to sixty-four MB.

According to aspects of the present disclosure, a system is provided for monitoring performance metrics corresponding to a first node that is operating a partition in association with an application. For example, the partition may be performing one or more functions for the application and the application may be communicating with the partition by routing communications through a partition client. Furthermore, on the first node, the partition may be running in a particular operational state that has resulted from a plurality of transactions that have occurred subsequent to some previous operational state of the partition on the first node. Exemplary performance metrics include a computing load being run on the first node (e.g. an amount of resource usage in general and/or relative to one or more other nodes) and a responsiveness of the partition (e.g. whether the partition is processing requests in a timely manner and/or whether the partition has crashed). Then, based on the performance metrics the system may instruct a second node to generate a new instance of the partition and to re-create the particular operational state that resulted from the plurality of transactions occurring subsequent to the previous operational state (e.g., the transactions that have occurred since the previous operational state was recorded and checkpointed into metadata). In some implementations, the second node may re-create the particular operational state by bringing the new instance into the previous operational state and sequentially replaying the plurality of transactions to the new instance of the partition.

In some configurations, the techniques disclosed herein enable the system to sequentially replay the plurality of transactions by obtaining metadata corresponding to the previous operational state of the partition and analyzing the metadata to identify the plurality of transactions that resulted in the desired operational state. The metadata may indicate a plurality of data object states of a plurality of data objects. For example, a first data object state may be "Easy," a second data object state may be "Blue," a third data object state may be "Full," etc. Alternatively and/or in addition, the metadata may indicate another plurality of transactions that have occurred prior to the previous operational state and which have resulted in the previous operational state. Under circumstances in which the plurality of transactions of the metadata stream corresponds to an amount of data that is too great for any individual prefetch buffer to load by itself, a prefetch manager may parse the metadata stream into a plurality of sub-portions and then cause individual prefetch buffers to load individual sub-portions in accordance with the techniques described herein with respect to the log stream. Accordingly, it should be appreciated that any technique described herein with respect to parsing the log stream of transactions into sub-portions and then causing individual prefetch buffers to fetch individual sub-portions may be equally apply to the metadata stream, and vice versa. However, for purposes of clarity and conciseness, these techniques will be described mainly with respect to the log stream of transactions.

After having obtained the metadata, the system may analyze the metadata to identify a checkpoint associated with a log stream of transactions and, based thereon, identifying a portion of the log stream that includes a plurality of transactions that have occurred with respect to the partition and subsequent to a previous operational state of the partition. The system may then parse the portion of the log stream of transactions into a plurality of sequential sub-portions and then cause multiple individual prefetch buffers to simultaneously load individual ones of the plurality of sequential sub-portions. For example, based on the checkpoint, the system may determine that the portion of transactions includes the last one-thousand transactions of several thousand transactions in the log stream and that these transactions correspond to three-hundred MB of transaction data. Then, the system may parse the transaction data into different sub-portions that are substantially equally sized in terms of data (e.g. each sub-portion may be apportioned a number of transactions up to a predetermined number of MBs) and/or are apportioned a substantially equal number of transactions (e.g. each sub-portion be apportioned one-hundred transactions with a final sub-portion being apportioned a remainder of transactions—if any). Upon determining the sub-portions of the portion of the log stream (e.g. the amount of transaction data following the checkpoint), the system may cause individual ones of multiple prefetch buffers to simultaneously load individual sub-portions.

Once at least an initial sub-portion is loaded, the system may begin a replay operation to sequentially replay the plurality of transactions to a new instance of the partition that has been loaded into the previous operational state. For example, a new instance of the partition may be booted-up on a desired computing node and, once operational, may then be brought into the previous operational state. Then, the replay operation may be performed to result in the new instance of the partition being transformed into a desired operational state that results from the plurality of transactions.

In some configurations, the techniques disclosed herein enable the system to analyze an individual prefetch buffer to determine whether it has fully loaded a corresponding sub-portion of the log stream (e.g. its currently assigned transaction data) prior to completely replaying a subset of transactions corresponding to an earlier sub-portion of the log stream. For illustrative purposes, and consider a scenario where the system has instructed a first prefetch buffer to load a first sub-portion of the log stream of transactions (e.g. a first subset of transactions corresponding to an initial four MB worth of the transaction data after the checkpoint) and has further instructed a second prefetch buffer to load a second sub-portion of the log stream of transactions (e.g. a second subset of transactions corresponding to the next four MB worth of the transaction data). Under these circumstances, while the system is in the process of replaying the first subset of transactions to the partition, the system may simultaneously be analyzing the second prefetch buffer to determine whether the second subset of transactions is fully loaded. Then, if the second prefetch buffer has fully loaded the second subset of transactions, the system may designate the second prefetch buffer as a full buffer to inform the system that it may begin replaying the second subset of transactions immediately upon finishing the first subset of transactions. Alternatively, if the second prefetch buffer is not fully loaded the second subset of transactions, the system may designate the second prefetch buffer as a partial buffer to inform the system that the second subset of transactions is not yet ready to be replayed.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual partitions and/or sub-portions of transactions and/or prefetch buffers may be distinguished by numerical designations without such designations corresponding to the claims or even other paragraphs of the Summary and/or Detailed Description. For example, any designation of a "first sub-portion" and "second sub-portion" of the transaction data within a paragraph of this disclosure is used solely to distinguish two different sub-portions of the transaction data within that specific paragraph—not any other paragraph and particularly not the claims.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items.

References made to individual items of a plurality of items can use a reference number followed by a parenthetical containing a number of a sequence of numbers to refer to each individual item. Generic references to the items may use the specific reference number without the sequence of numbers. For example, the items may be collectively referred to with the specific reference number preceding a corresponding parenthetical containing a sequence number.

DETAILED DESCRIPTION

Figure 1:
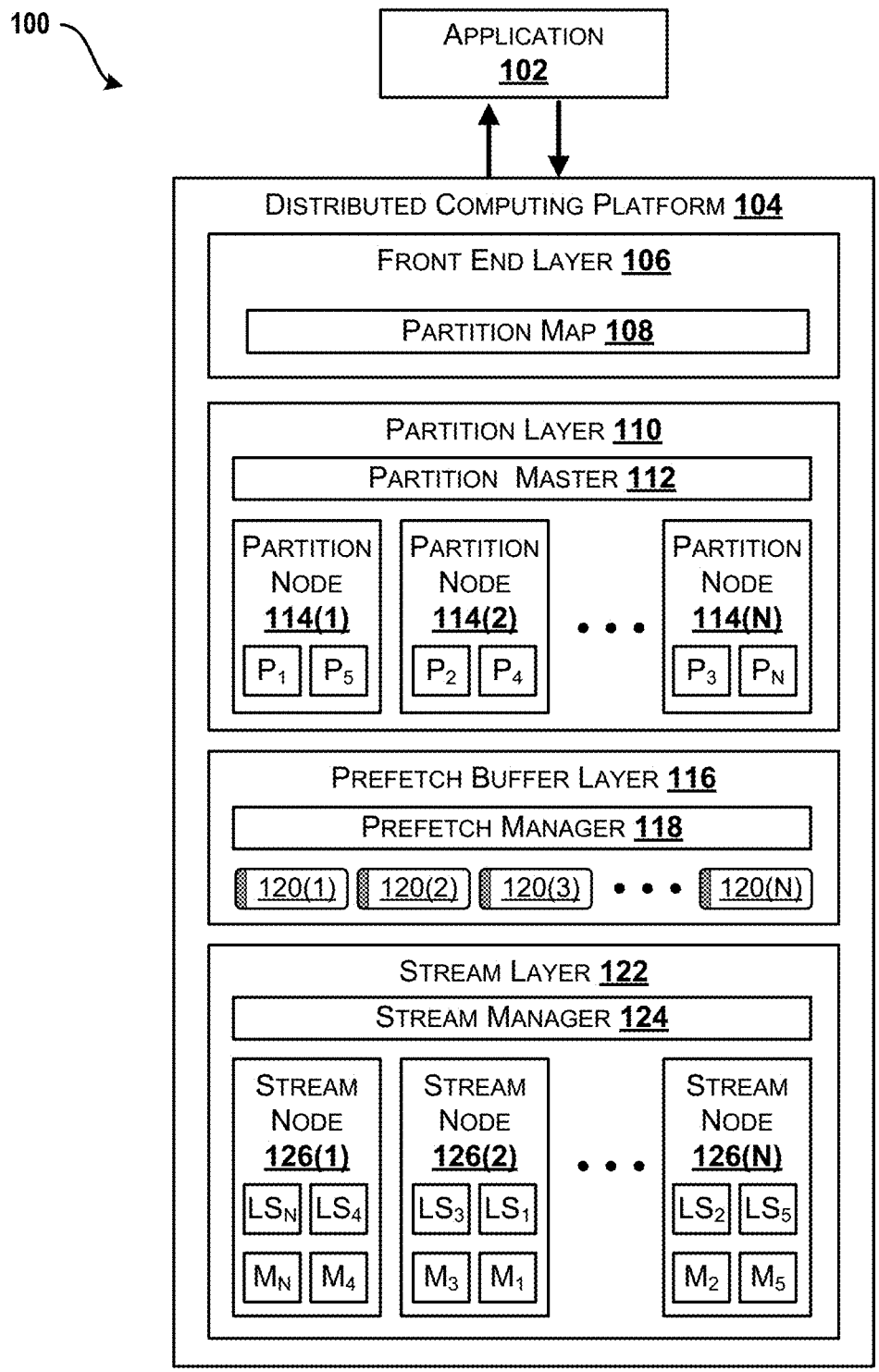
FIG. 1 illustrates an exemplary computing architecture that includes a distributed computing platform that is configurable to deploy techniques described herein.

The following Detailed Description describes technologies for prefetching metadata sub-portions and/or log streams sub-portions to recreate partition states in a distributed computing system. Generally described, configurations disclosed herein enable a system to monitor performance metrics of a first node that is operating a partition in a particular operational state and, based on the performance metrics, cause a second node to recreate the partition in the particular operational state. Since the particular operational state may result from a plurality of transactions being performed with respect to the partition subsequent to a previous operational state, re-creating the partition may include causing the partition to enter the previous operational state and then sequentially replaying, in the same order, the same plurality of transactions that had previously been performed. To enable subsequent replaying of the plurality of transactions, the distributed computing system may record the transactions in one or both of the metadata stream of transactions or a log stream of transactions associated with the partition. The plurality of transactions may be read from the metadata stream and/or log stream and loaded into a buffer from which the transactions are replayed in their original order to a new instance of the partition. However, waiting for a single buffer to load a large number of transactions before commencing the replay operation increases the duration of partition loading and, ultimately, negatively impacts a distributed computing system's load-balancing efficiency and its availability of service. Accordingly, causing a plurality of prefetch buffers to simultaneously load sub-portions of the plurality of transactions and then commencing the replay operation after an initial subset of the transactions is loaded provides benefits over waiting for the entirety of the plurality of transactions to fully load prior to commencing the replay operation.

For illustrative purposes, consider a scenario where a portion of the log stream of transactions that is to be replayed during a particular replay operation has grown in size to three-hundred megabytes (MB) of transaction data. Further consider that the log stream of transactions can be read at a rate of four MB per second (MBPS). Under these circumstances, waiting for the entire three-hundred MB of transaction data to load prior to commencing the replay operation would result in a loading delay of seventy-five seconds. In contrast, splitting the three-hundred MB of transaction data into a plurality of four MB sub-portions and commencing the replay operation upon an initial sub-portion (e.g. the first four MB of the transaction data) being fully loaded onto an individual prefetch buffer would result in a loading delay of only one second. Accordingly, deploying multiple prefetch buffers to simultaneously load relatively small sub-portions of the transaction data provides a marked improvement over deploying only a single buffer to load the entire relevant portion of the transaction data.

Furthermore, deploying multiple prefetch buffers to simultaneously load multiple sub-portions causes a stream read position to remain ahead of a record processing position after the initial loading period (e.g. one-second per the immediate example). To illustrate this point, further suppose that the system includes sixteen prefetch buffers each capable of reading the log stream of transactions at the four MBPS rate. Under these circumstances, if each of these sixteen prefetch buffers is instructed to read a corresponding four MB sub-portion at the outset of a read operation, then after the first one-second of the read operation the system will have pre-fetched the first sixty-four MB of the three-hundred MB of transaction data. Then, upon the initial four MB sub-portion being replayed, it's corresponding prefetch buffer may be instructed to begin loading another four MB sub-portion that corresponds to a range of transactions from the sixty-fourth MB of the transaction data to the sixty-eighth MB of the transaction data. Stated alternatively, under these circumstances, the design parameters of the system would cause the stream read position to lead the record processing position by roughly sixty to sixty-four MB.

For purposes of the present disclosure, embodiments are described with reference to a distributed computing platform having a front-end layer, a partition layer, a prefetch buffer layer, and a stream layer. However, the methods and techniques described herein can be performed in different types of operating environments having alternate configurations of the functional components described herein. As such, the embodiments described herein are merely exemplary, and it is contemplated that the methods and techniques may be extended to other implementation contexts and/or environments.

A distributed computing platform may be implemented as a cloud-based computing platform that runs cloud services across different data centers and/or geographic regions. The cloud-based computing platform can implement a fabric controller component for provisioning and managing resource allocation, deployment/upgrade, and management of cloud services. Typically, a cloud-based computing platform is configured to store data and/or run service applications in a distributed manner. The service application components (e.g., tenant infrastructure or tenancy) of the cloud-based computing platform may include nodes (e.g., computing devices, processing units, or blades in a server rack) that are allocated to run one or more portions of a tenant's service applications.

When more than one service application is being supported by an individual node, the node may be partitioned into virtual machines, application containers and/or physical machines that concurrently run the separate service applications, respectively, in individualized computing environments that support the resources and/or operating systems specific to each service application. Further, each service application may be divided into functional portions such that each functional portion is able to run on a separate virtual machine, application container, and/or physical machine. In cloud-based computing platforms, multiple servers may be used to run service applications and perform data storage operations in a cluster. In particular, the servers may perform data operations independently but exposed as a single device referred to as a cluster. Each server in the cluster may be referred to as a node.

Turning now to FIG. 1, embodiments are described with reference to a computing architecture 100 that includes an application 102 that is configured to send requests and/or receive responses from a distributed computing platform 104. The distributed computing platform 104 may include a front-end (FE) layer 106 that maintains a partition map 108. The FE layer 106 may be configured for receiving incoming requests from the application 102. Upon receiving a request, the FE layer 106 may authenticate and authorize the request. The FE layer 106 may also reference a partition map 108 to route the request to an appropriate partition node (e.g. a computing node configured with one or more partitions) and, ultimately, to a partition for which the request is intended. For example, the partition map 108 may be maintained by the FE layer 106 to keep track of a plurality of partitions (e.g., by partition name or other identifier) and which partition node is serving which partition names.

The distributed computing platform 104 may further include a partition layer 110 having a partition master 112 and one or more partition nodes 114(1) through 114(N) (which may collectively be referred to herein as partition nodes 114) that are assigned to operate one or more individual partitions. For example, a plurality of service applications and/or functional components thereof may be divided amongst a plurality of different partitions (labeled as $P_1$-$P_N$). As used herein, the integer "N" is used to denote an open-ended integer amount of various system components described herein. Accordingly, where two or more system components are described as having a first through N-th number of instances, these system components may have the same number of instances or may have different numbers of instances. For example, a first component having N instances may have the same amount of or more instances than a second component having N instances. The partition master 112 may be configured to assign the partitions to specific ones of the partition nodes 114. For example, the partition master may instruct partition node 114(1) to cease operation of a current instance of $P_5$ while further instructing partition node 114(2) to generate a new instance of $P_5$ in an operational state that matches the operational state which $P_5$ was operating in on the partition node 114(1). Partition master 112 may further be configured to determine when a particular partition is not currently hosted by any server (e.g. due to a partition node failure and/or individual partition crash) and reassign the partition to a different partition node. For example, the partition master 112 may determine that $P_5$ has crashed on partition node 114(1) and may respond by instructing partition node 114(2) to generate a new instance of $P_5$ in an operational state that is duplicative of an operational state the previous instance of $P_5$ was in just prior to the crash. Partition master 112 may also be configured to control load-balancing of the partition nodes 114 by appropriately assigning the individual partitions across the partition nodes 114. For example, the partition master 112 may determine that resource utilization of the partition node 114(1) is relatively high as compared to resource utilization of the partition node 114(2) and may respond by moving $P_5$ to the partition node 114(2) for load-balancing purposes.

The distributed computing platform 104 may further include a prefetch buffer layer 116 having a prefetch manager 118 and a plurality of prefetch buffers 120. The prefetch buffer layer 116 may be configured to temporarily store a plurality of transactions that have occurred with respect to a particular partition and which have resulted in the particular partition being in a particular operational state. The prefetch buffer layer 116 may be further configured to enable a replay operation that includes sequentially replaying the plurality of transactions to a new instance of the particular partition thereby causing the particular partition to return to the particular operational state. In some configurations, the prefetch buffer layer 116 is configured to communicate with a stream layer 122 of the distributed computing platform 104 to obtain the plurality of transactions and then to communicate the plurality of transactions to particular partition nodes 114. Furthermore, the prefetch buffer layer 116 may be configured to parse the plurality of transactions into a plurality of sub-portions and to assign individual ones of the plurality of prefetch buffers 120 to load individual sub-portions. For example, in a scenario where the plurality of transactions corresponds to three-hundred MB of transaction data, the prefetch manager 118 may determine a plurality of sub-portions (e.g. seventy-five sub-portions each being substantially four MB in size). Then, the prefetch manager 118 may instruct individual prefetch buffers 120 to load individual sub-portions of the transaction data wherein each sub-portion of the transaction data includes a subset of the plurality of transactions. For example, the first four MB of transaction data may include the first one-thousand transactions of the plurality of transactions and so on. Once a particular prefetch buffer 120 has completed loading a first sub-portion and also communicating the first sub-portion to a corresponding partition node 114, the partition master 112 may instruct the particular prefetch buffer to load a second sub-portion of the log stream of transactions.

The stream layer 122 may include a stream manager 124 and a plurality of stream nodes 126 that include log streams of transactions (labeled as $LS_1$-$LS_N$) associated with individual partitions and/or metadata (labeled as $M_1$-$M_N$) associated with individual partitions. The stream manager 124 may be configured to manage the log streams of transactions and/or metadata across the plurality of stream nodes 126. For example, during operation of a particular partition, the partition layer 110 may process incoming transactions corresponding one or more service applications such as, for example, the application 102. As a more specific but non-limiting example, the application 102 may transmit one or more data requests and/or instructions to a particular partition via the FE layer 106. As these data requests and/or instructions are processed by the partition layer 110 as transactions at the particular partition, the stream manager 124 may record these transactions in a log stream of transactions corresponding to the particular partition (e.g. by appending the received transaction data to the log stream of transactions). Furthermore, the stream manager 124 may be configured to assign a sequence ID to each individual transaction to keep track of a sequence in which the transactions were performed with respect to the particular partition and, ultimately, to ensure that a replay operation replays the individual transactions in precisely the same sequence order.

Figure 2:
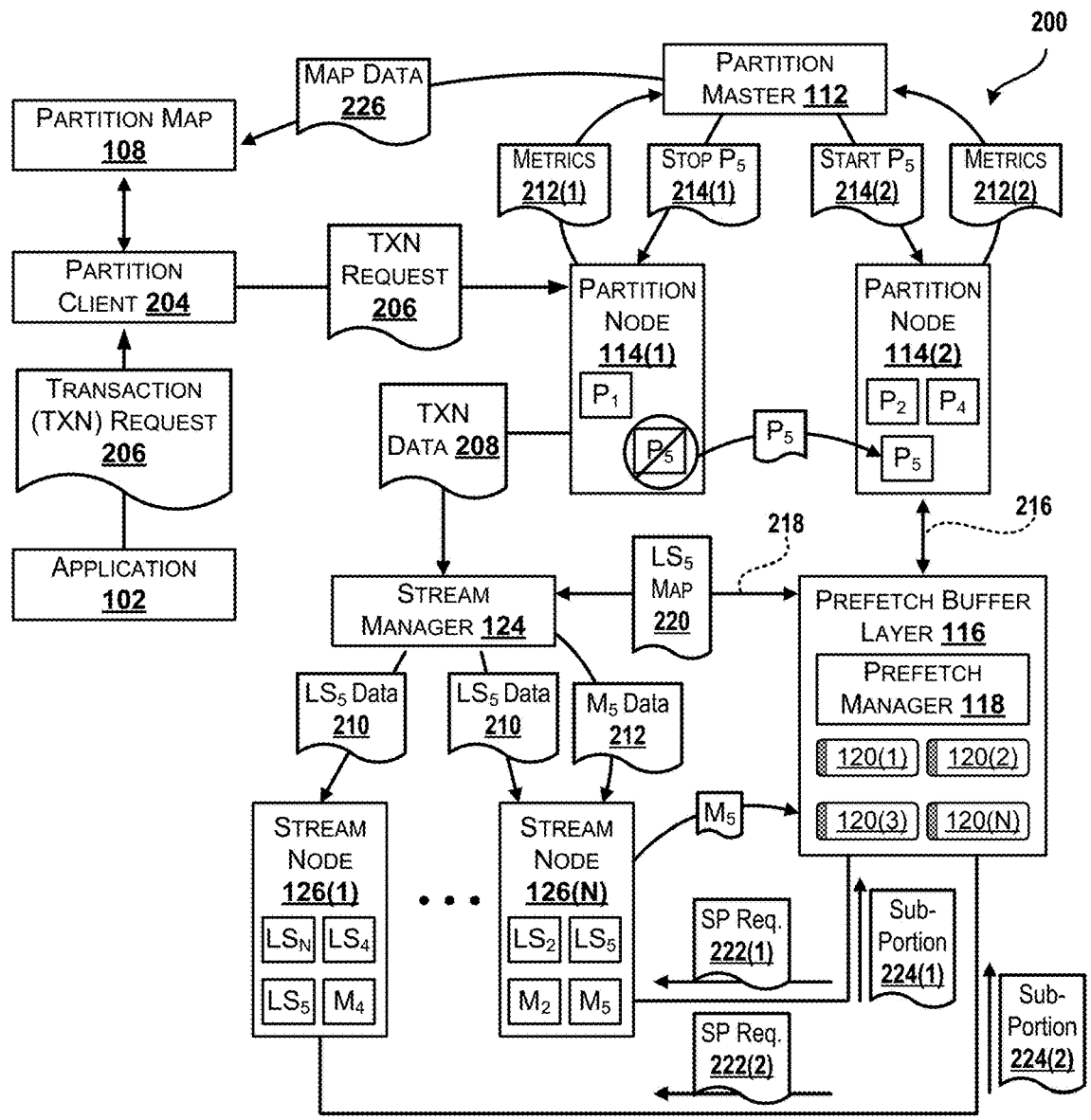
FIG. 2 illustrates an exemplary block diagram and data flow scenario of a distributed computing platform that is configured to prefetch sub-portions of metadata stream transaction data and/or log stream transaction data for re-creating partition states in accordance with techniques described herein.

Turning now to FIG. 2, a block diagram and data flow scenario is illustrated of a distributed computing platform that is configured to prefetch sub-portions of metadata stream transaction data and/or log stream transaction data for re-creating partition states in accordance with techniques described herein. For purposes of clarity and conciseness, the discussion of FIG. 2 (and the other figures of this disclosure for that matter) continues mainly with respect to parsing the log stream of transactions into sub-portions and causing the prefetch buffers to obtain his sub-portions. However, it should be appreciated that any prefetch related technique described with respect to the log stream of transactions is equally applicable to the metadata stream. In particular, FIG. 2 shows a high-level architecture of a cloud computing system 200 in accordance with implementations of the present disclosure. Among other components, the cloud computing system 200 may include the partition master 112, one or more partition nodes 114 operating one or more partitions (e.g. $P_1$-$P_N$), a stream manager 124 that maintains log data 202 on one or more stream nodes 126, and a prefetch buffer layer 116 having a prefetch manager 118 and the plurality of prefetch buffers 120. The cloud computing system 200 may also include a partition client 204 that is configured to reference the partition map 108 to act as a liaison between the application 102 and the partition nodes 114. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location.

With respect to the example data flow scenario of FIG. 2, the application 102 is shown to transmit a transaction request 206 to the partition client 204 which ultimately routes the transaction request 206 to a corresponding partition. For purposes of the present discussion, assume that the application 102 has generated the transaction request 206 with respect to a particular service application that is being operated on partition $P_5$ and furthermore that the transaction request 206 is received by the partition client 204 at a time when the partition $P_5$ is being operated on the partition node 114(1). In various embodiments, the partition client 204 may be linked to the application 102 and may be configured to utilize the partition map 108 to route requests from the application 102 to an appropriate partition. For example, upon receiving the transaction request 206, the partition client 204 may determine that the transaction request 206 has been generated with respect to the particular service application that is being operated on partition $P_5$. Then, the partition client 204 may reference the partition map 108 to determine that the partition $P_5$ is currently being operated by partition node 114(1). Based on the determinations that the transaction request 206 is intended for $P_5$ which is operating on partition node 114(1), the partition client 204 may route the transaction request 206 to the partition node 114(1) which then passes the transaction request 206 to the partition $P_5$.

As used herein, a "transaction" may refer to specific processes such as, for example, computer commands and/or routines that facilitate the workflow of the application 102 and/or the storage for the application 102. For example, the transaction request 206 may cause the partition $P_5$ to process and commit to memory a transaction that changes a state of a data object in some specific manner. For illustrative purposes, suppose that the application 102 is a cloud-based multiplayer strategy videogame and that the partition $P_5$ is operating one of numerous service applications corresponding to application 102. Further suppose that the particular service application being operated by partition $P_5$ corresponds to a particular user account and parameters thereof that vary over time based on transactions being performed on $P_5$. With particular reference to the log data 202 of FIG. 2, under these circumstances, an exemplary transaction request 206 may be associated with changing states of one or more data objects of the cloud-based multiplayer strategy videogame such as, for example, data object $O_D$ associated with a difficulty setting, data object $O_E$ associated with a color of a sword element, and data object $O_F$ associated with a current health status of a user.

Upon successfully processing one or more transactions corresponding to the transaction request 206, the partition node 114(1) may transmit transaction data 208 to the stream manager 124 to indicate that the one or more transactions have been successfully performed. The transaction data 208 may further associate a sequence ID with individual transactions to preserve a record of a sequence in which the one or more transactions were performed. For example, with reference to the log data 202 and in particular the partition five log stream of transactions labeled $LS_5$, individual transactions of the transaction data 208 may indicate an ordered sequence of commands that have been performed with respect to specific data objects, e.g. a first transaction labeled with sequence ID 233 may correspond to a computer command $CMD_{32}$ being performed with respect to data object $O_E$, a second transaction labeled with sequence ID 234 may correspond to a computer command $CMD_{56}$ being performed with respect to a data object $O_D$, etc. For purposes of the present discussion, suppose that $CMD_6$ corresponds to a command to incrementally increase the difficulty setting of the cloud-based multiplayer strategy videogame. For example, if the current difficulty setting of the cloud-based multiplayer strategy videogame is set to "Easy" $CMD_6$ may change the difficulty setting to "Medium," whereas if the current difficulty setting of the cloud-based multiplayer strategy videogame is set to "Medium" $CMD_6$ may change the difficulty setting to "Hard." Further suppose that the difficulty setting of "Hard" is the highest difficulty setting possible for the cloud-based multiplayer strategy videogame so that if the command $CMD_6$ is performed while the current difficulty setting is already set to "Hard" the difficulty setting will not actually change. It can be appreciated that a current state of a particular data object may have an effect on the result of any particular command being performed. Accordingly, it can further be appreciated that performing the plurality of transactions to a new instance of a particular partition in a different order than the plurality of transactions was performed with respect to a previous instance of the partition may result in an operational state of the new instance not being duplicative of an operational state of the previous instance.

Based on the transaction data 208, the stream manager 124 may compile a log stream of transactions corresponding to the individual partitions and may transmit data corresponding to the log stream of transactions to one or more stream nodes 126 for durable storage. For example, as illustrated, the stream manager 124 is shown to transmit log stream transaction data 210 (also referred to herein as simply "transaction data"), that may be appended to the log stream of transactions $LS_5$, to both of the stream node 126(1) and the stream node 126(N). The stream manager 124 may also compile metadata corresponding to the individual partitions and may transmit the metadata to one or more stream nodes 126 for durable storage. For example, as illustrated, the stream manager 124 is shown to transmit metadata $M_5$ (i.e. metadata corresponding to partition $P_5$) to the stream node 126(N). Although as illustrated the metadata $M_5$ is shown to be transmitted to a single stream node, in various implementations metadata may be transmitted to and stored across multiple stream nodes.

In some implementations, the metadata may reflect a previous operational state of the partition at some particular point in time and the log stream of transactions may be usable to determine a more recent operational state of the partition. For example, the metadata may indicate one or more data object states associated with a particular partition at the particular point in time in the log stream of transactions may indicate one or more sequential transactions that have occurred since the particular point in time and have changed the one or more data object states. For purposes of the present discussion, assume that the metadata indicates a data object state of "Easy" corresponding to the "Difficulty Setting" data object, i.e. data object $O_D$. In some implementations, the metadata may directly indicate the one or more data object states as of a particular transaction having occurred with respect to the partition. For example, the metadata $M_5$ may include an indication of a checkpoint associated with the log stream of transactions $LS_5$ that indicates data object states for individual data objects as of a particular transaction having been performed, e.g. as identified by a sequence ID. In the illustrated scenario, the metadata $M_5$ indicates that as of transaction number 234 having been performed with respect to partition $P_5$, the state of data object $O_D$ is "Easy," the state of data object $O_E$ is "Blue," the state of data object $O_F$ is "Full," etc. In some implementations, the metadata may indirectly indicate the one or more object states. For example, the metadata $M_5$ may include a listing of one or more transactions that have been processed with respect to the partition prior to the particular point in time and have resulted in the partition entering the previous operational state at the particular point in time. For example, in the illustrated scenario, the metadata $M_5$ indicates that as of transaction number 234 ($TXN_{234}$) having been performed with respect to partition $P_5$, both of $TXN_1$ and $TXN_{13}$ have occurred with respect to data object $O_D$. Furthermore, suppose that the metadata associated with each of $TXN_1$ and $TXN_{13}$ indicates a particular command such as, $CMD_6$ and/or $CMD_{56}$.

The partition master 112 may also be configured to monitor performance metrics 212 associated with various partition nodes 114 for purposes of allocating the plurality of partitions across the plurality of partition nodes 114. For example, as illustrated, the partition master 112 is monitoring first performance metrics 212(1) corresponding to the first partition node 114(1) and is further monitoring second performance metrics 212(2) corresponding to the second partition node 114(2). Exemplary performance metrics include, but are not limited to, an indication that one or more partitions has crashed on a particular node, resource utilization corresponding to individual nodes, and/or software update schedules associated with individual nodes. For purposes of the present discussion, assume that the first performance metrics 212(1) include an indication that the partition $P_5$ has crashed at the first partition node 114(1) and further assume that the performance metrics 212(2) indicate the second partition node 114(2) has ample available computing resources to initiate a new instance of the partition $P_5$. Further assume that based on these performance metrics 212, the partition master 112 has made a determination to move the partition $P_5$ from the first partition node 114(1) to the second partition node 114(2). Accordingly, as illustrated, the partition master 112 may transmit a first command 214(1) to cause the first partition node 114(1) to cease operation of the partition $P_5$ and a second command 214(2) to cause the second partition node 114(2) to begin operation of a new instance of the partition $P_5$ and furthermore to bring the new instance of the partition $P_5$ into an operational state that is duplicative of the last operational state recorded by the combination of the metadata $M_5$ and the log stream of transactions $LS_5$.

Upon receiving the second instruction 214(2), the second partition node 114(2) may establish a communication link 216 with the prefetch buffer layer 116 to employ the prefetch buffer layer's 116 services in quickly re-creating the new instance of the partition $P_5$ and bringing it into the operational state that is duplicative of the last operational state recorded by the combination of the metadata $M_5$ and the log stream of transactions $LS_5$. Then, the prefetch buffer layer 116 may establish a communication link 218 with the stream manager 124 through which the stream manager 124 may transmit $LS_5$ map information 220 to inform the prefetch manager 118 as to which stream nodes 126 are currently storing various portions of the log data 202. For example, as illustrated, the $LS_5$ map information 220 may indicate that the metadata $M_5$ is currently being stored on the N-th stream node 126(N) and that each of the first stream node 126(1) and the N-th stream node 126(N) are each storing copies of the log stream of transactions $LS_5$. Accordingly, the prefetch manager 118 may request the metadata $M_5$ from the N-th stream node 126(N). Then, the prefetch manager 118 may communicate various details of the metadata $M_5$ to the second partition node 114(2) to bring the new instance of the partition $P_5$ into the previous operational state.

In some configurations, the metadata $M_5$ may correspond to an amount of data that is too great for any one individual prefetch buffer 120 to fully load. For example, suppose that each individual prefetch buffer is capable of loading up to 4.2 MB of data and furthermore that the metadata $M_5$ corresponds to 100 MB of data. Under these circumstances, the prefetch manager 118 may parse the metadata into a plurality of sub-portions and then cause individual prefetch buffers to load individual sub-portions in accordance with techniques described herein with respect to the log stream of transactions. In some configurations, the metadata may correspond to an amount of data that can be fully loaded onto a single prefetch buffer 120. Under these circumstances, the prefetch manager 118 may simply instruct a particular prefetch buffer to load the entirety of the metadata.

The prefetch manager 118 may analyze the metadata to identify a checkpoint in the log stream of transactions associated with the partition and, based on the checkpoint, may identify a plurality of transactions that have occurred with respect to the partition subsequent to the previous operational state. As illustrated, the metadata $M_5$ indicates that a current checkpoint for $LS_5$ is designated as transaction sequence ID number 234, i.e. the identified checkpoint informs the prefetch manager 118 that the data object states indicated by the metadata $M_5$ are current up through transaction number 234. Accordingly, the prefetch manager 118 may determine that the portion of the log stream of transactions that follows transaction number 234 corresponds to a plurality of transactions that have yet to be reflected within the metadata $M_5$. To bring the new instance of the partition $P_5$ into the desired operational state (e.g. the last state recorded by the combination of $M_5$ and $LS_5$), the partition node 114(2) may first bring the new instance of the partition $P_5$ into the previous operational state indicated by the metadata $M_5$. Then, a replay operation may be performed to replay to the new instance of the partition $P_5$ that portion of the log stream of transactions $LS_5$ which follows the checkpoint.

Based on the identified checkpoint, the prefetch manager 118 may identify a plurality of transactions following the last checkpointed transaction. As illustrated, this portion of the log stream of transactions includes transactions $TXN_{235}$ through $TXN_{105,123}$ which corresponds to three-hundred MB of data. Continuing with the supposition that each individual prefetch buffer is capable of loading up to 4.2 MB of data, it can be appreciated that no individual prefetch buffer is capable of loading the entirety of the three-hundred MB of data. Accordingly, the prefetch manager 118 may parse the portion of the log stream of transactions to be replayed into a plurality of sequential sub-portions. For example, the three-hundred MB portion of the log stream of transactions may be parsed into seventy-five sequential sub-portions that each correspond to substantially four MB of the log stream of transactions. In some implementations, the prefetch manager 118 may parse the portion of the log stream into the plurality of sequential sub-portions based at least partially on the sequence IDs. For example, the prefetch manager 118 may be configured to parse the portion based on predetermined target data sizes (e.g. four MB each) but also to not split data associated with anyone individual transaction across two or more individual prefetch buffers 120. Accordingly, in some implementations, a plurality of sequential sub-portions may be substantially equal to but not exactly equal to the predetermined target data size. For example, the prefetch manager 118 may determine a first sub-portion as corresponding to $TXN_{235}$ through $TXN_{1399}$ corresponding to the first 3.97 MB of the portion of the log of transactions, a second sub-portion as corresponding to $TXN_{1400}$ through $TXN_{3099}$ corresponding to the next 4.01 MB of the portion of the log of transactions, etc.

Then, the prefetch manager 118 may issue read instructions to individual ones of the prefetch buffers 120 to cause multiple prefetch buffers 120 to simultaneously load different individual sub-portions of the plurality of sequential sub-portions of the transaction data. For example, the prefetch manager 118 may issue a first read instruction to cause the first prefetch buffer 120(1) to load the first sub-portion (e.g. the first 3.9 MB that includes $TXN_{235}$ through $TXN_{1399}$), a second to read instruction to cause the second prefetch buffer 120(2) to load the second sub-portion (e.g. the next 4.01 MB that includes $TXN_{1400}$ through $TXN_{3099}$), etc. Upon receiving a particular read instruction, the individual prefetch buffers 120 may issue sub-portion requests to one or more stream nodes 126 that are determined to be storing, individually and/or in combination, at least the sub-portion corresponding to the read instruction. For example, as illustrated, the first prefetch buffer 120(1) is shown to transmit a first sub-portion (SP) request 222(1) to the N-th stream node 126(N), the second prefetch buffer 120(2) is shown to transmit a second SP request 222(2) to the first stream node 126(1), and so on. Then, in response to the SP requests 222, the individual stream nodes 126 are shown to transmit the requested sub-portions to a corresponding individual prefetch buffer 120. For example, as illustrated, the first stream node 126(1) is shown to transmit a first sub-portion 224(1) to the first prefetch buffer 120(1), the N-th stream node 126(N) is shown to transmit a second sub-portion 224(2) to the second prefetch buffer 120(2), and so on. Ultimately, the individual sub-portions 224 and, more particularly, subsets of transactions corresponding thereto, are sequentially replayed to the new instance of the partition to return the partition to a desired operational state.

In some implementations, the prefetch manager 118 may be configured to determine transaction data replica distributions corresponding to replications of multiple copies of the transaction data across multiple ones of the plurality of stream nodes. For example, as illustrated in FIG. 2, the stream manager 124 is illustrated to transmit copies of the transaction data 210 to each of the first stream node 126(1) and the N-th stream node 126(N). Therefore, the prefetch manager 118 may be able to obtain various sub-portions of the transaction data 210 from various ones of the plurality of stream nodes 126. In some implementations, the prefetch manager 118 may be configured to generate read instructions that instruct the prefetch managers 120 to obtain sub-portions of the transaction data 210 from specific ones of the stream nodes 126 in order to efficiently balance read traffic across the nodes. For example, the prefetch manager 118 may issue sixteen initial read instructions to cause the prefetch buffers 120 to obtain corresponding sub-portions of the transaction data from multiple different stream nodes 126 rather than causing the prefetch buffers to attempt to simultaneously read from the same nodes and potentially disrupt each other's read operations.

In some configurations, upon the new instance of the partition being loaded onto a particular node and/or being decommissioned from another particular node, the partition master 112 may transmit map data 226 to update the partition map 108. For example, upon the partition $P_5$ being moved from the partition node 114(1) to the partition node 114(2), the partition master 112 may update the partition map 108 to inform the partition client to no longer route transaction requests 206 associated with the application 102 to the first partition node 114(1) but rather to route such requests to the second partition node 114(2).

Figure 3:
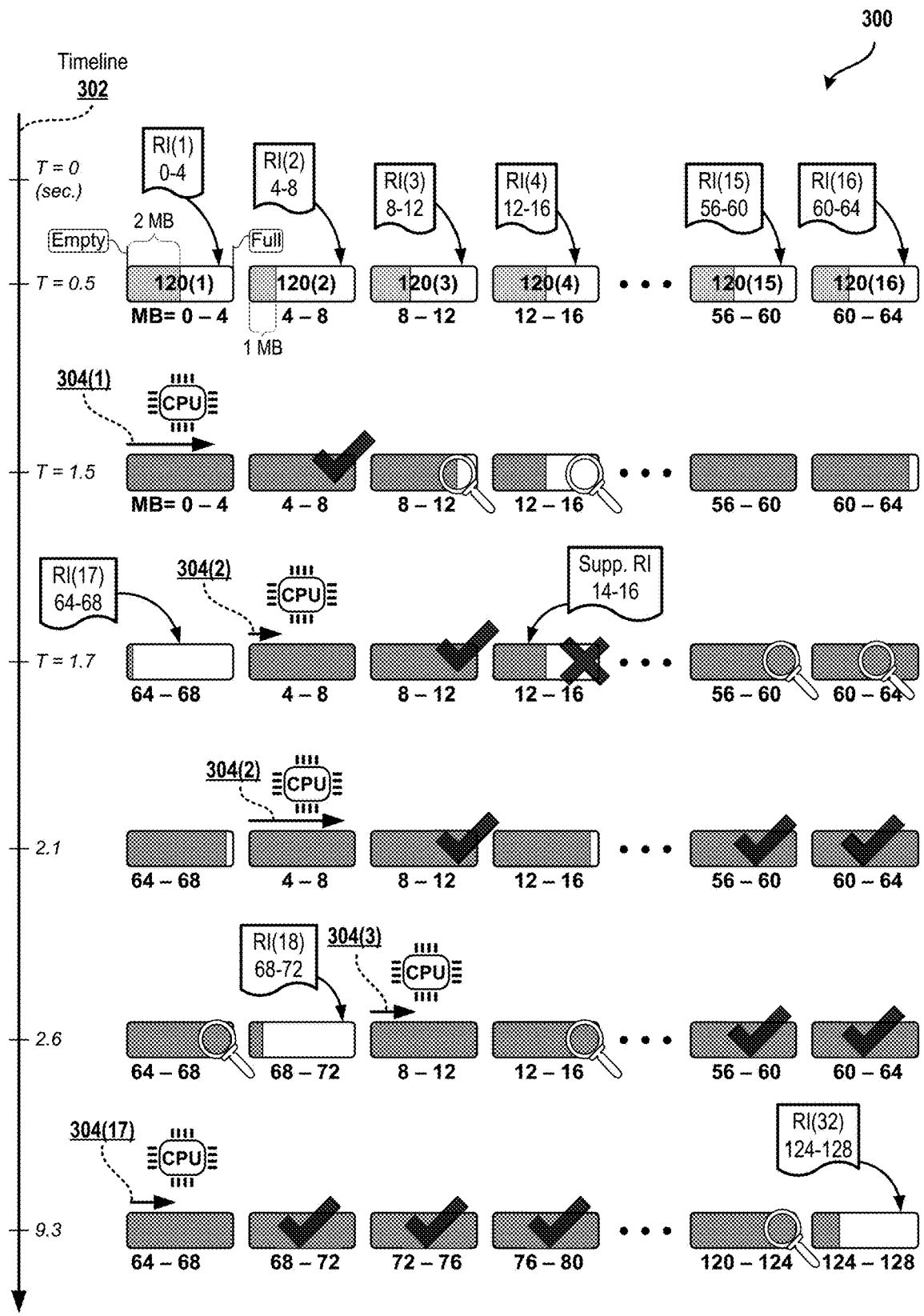
FIG. 3 is a pictorial flow diagram that shows an illustrative process of instructing multiple prefetch buffers to simultaneously load individual sub-portions of a metadata stream of transactions and/or a log stream of transactions and then causing the individual sub-portions to be sequentially processed to bring new instance of a partition into a desired operational state.

Turning now to FIG. 3, a pictorial flow diagram shows an illustrative replay operation 300 of instructing multiple prefetch buffers 120 to simultaneously load individual sub-portions of transaction data and then causing transactions included within the individual sub-portions to be sequentially processed to bring new instance of a partition into a desired operational state. The replay operation 300 is described with reference to a timeline 302 that progresses from the top of the page to the bottom of the page and is labeled in terms of seconds. It can be appreciated that specific times are labeled on the timeline 302 for illustrative purposes only and with respect to the specific system configurations and process parameters described herein. Accordingly, the system configurations, process parameters, and specific times labeled on the timeline 302 are set forth solely to convey the techniques described herein and not to limit the scope of the claimed subject matter.

The replay operation 300 is further described with reference to 16 individual prefetch buffers, i.e. prefetch buffer 120(1) through prefetch buffer 120(16), six of which are illustrated in FIG. 3. Each of the six prefetch buffers selected for illustration are graphically represented at six different points in time to clearly illustrate concepts described herein. In particular, of the 16 individual prefetch buffers included in this particular system configuration, prefetch buffers one through four, fifteen, and sixteen are graphically represented at each of 0.5 seconds, 1.5 seconds, 1.7 seconds, 2.1 seconds, 2.6 seconds, and 9.3 seconds. Furthermore, in each graphical representation of the individual prefetch buffers, a portion of each individual prefetch buffer has been darkened from left to right to represent graphically a percentage and/or amount of an individual sub-portion of transaction data that has been loaded as of the indicated point in time. The darkened region being close to the left border of the individual prefetch buffer is representative of the individual prefetch buffer being empty, e.g. having no transaction data loaded. The darkened region being close to the right border of the individual prefetch buffer is representative of the individual can fetch buffer being full, e.g. having an entire sub-portion of transaction data loaded. The darkened region falling between the extremes of "Empty" and "Full" is a linear graphical representation of a percentage of a sub-portion that has been loaded, e.g. the first prefetch buffer 120(1) is graphically represented as holding two MB of a first sub-portion (i.e. 50% of the four MB) whereas the second prefetch buffer 120(2) is graphically represented as holding one MB of a second sub-portion (i.e. 25% of the four MB).

For purposes of the present discussion, assume that each individual prefetch buffer 120 is capable of loading up to 4.2 MB of data and that the portion of the log stream of transactions corresponds to three-hundred MB of data. Further suppose that each individual prefetch buffer is capable of reading the log stream of transactions from one or more of the stream nodes 126 at a rate of up to four MBPS. In some implementations, the actual rate that an individual prefetch buffer is capable of reading a specific sub-portion may depend on a variety of factors such as, for example, a level of fragmentation of various bytes of data corresponding to the specific sub-portion and/or a level of resource utilization on a particular stream node 126 from which the individual prefetch buffer is attempting to read the specific sub-portion. Further suppose that the prefetch manager 118 (not shown in FIG. 3), is configured to parse a portion of the log stream of transactions, corresponding to a particular replay operation, into a plurality of sequential sub-portions that each correspond to substantially four MB of transaction data.

At some point in time prior to T=0, the prefetch manager 118 may determine at least an initial batch of the plurality of sequential sub-portions of the log stream of transactions. For example, the prefetch manager 118 may analyze the metadata $M_5$ to identify a checkpoint in the log stream of transactions $LS_5$. Then, based on the checkpoint, the prefetch manager 118 may identify the portion of the log stream of transactions $LS_5$ corresponding to the plurality of transactions occurring subsequent to the previous operational state of the partition. For example, as illustrated in FIG. 2, the prefetch manager 118 may identify transactions $TXN_{235}$ through $TXN_{105,123}$ as being "New" in the sense that these transactions are not reflected in the object states indicated by the metadata $M_5$. Ultimately, once the relevant portion of the log stream of transactions is identified, the prefetch manager 118 may parse this relevant portion into a plurality of sub-portions. For example, continuing with the present assumptions, the prefetch manager 118 may parse the relevant portion into sequential and substantially equally sized sub-portions of roughly 4 MB.

At time T=0.0, the prefetch manager 118 may issue read instructions to individual prefetch buffers 120. For example, the prefetch manager 118 may issue a first read instruction RI(1) to the first prefetch buffer 120(1), a second read instruction RI(2) to the second prefetch buffer 120(2), and so on. Under the present assumptions, each of the read instructions corresponds to sequential portions of roughly four MB of data such that the initially issued sixteen read instructions correspond to roughly the first sixty-four MB of the three-hundred MB of transaction data. In FIG. 3, each individual prefetch buffer's current to read assignment is indicated just below the graphical representation of each individual prefetch buffer. For example, at T=0.5 the first prefetch buffer 120(1) has a read assignment corresponding to the first four MB of the log stream portion whereas at T=1.7 the first prefetch buffer 120(1) has a new read assignment corresponding to roughly MBs 64-68 of the log stream portion. In some implementations, the replay operation may commence once the initial sub-portion is fully loaded onto the first prefetch buffer 120(1). For example, under the present assumptions where the first read instruction RI(1) is issued at T=0 and corresponds to roughly four MB of data, the first prefetch buffer 120(1) will fully load the initial sub-portion at roughly T=1 second if it reads at close to its maximum rate of four MBPS. Accordingly, in the illustrated scenario, the replay operation begins at roughly T=1.

At time T=0.5, the first prefetch buffer 120(1) has loaded one-half of the initial sub-portion corresponding to the first read instruction RI(1), the second prefetch buffer 120(2) has loaded one-quarter of the next sub-portion corresponding to the second read instruction RI(2), and the other illustrated prefetch buffers have each loaded an amount of their corresponding sub-portion as graphically represented. Furthermore, at time T=0.5, the replay operation 300 has not yet begun processing any sub-portions. In some implementations, the replay operation 300 will commence replaying transactions corresponding to the initial sub-portion once the initial sub-portion is fully loaded into the first prefetch buffer 120(1).

At time T=1.5, the replay operation 300 has nearly completed processing the first sub-portion as indicated by the processor symbol (labeled "CPU") and the corresponding progress-arrow 304(1) indicating how much of the first sub-portion has been replayed to the partition. In some implementations, the prefetch manager 118 may be configured to analyze one or more prefetch buffers that are sequentially in front of a current processing position. For example, in the illustrated scenario, at time T=1.5 the prefetch manager 118 has already analyzed the second prefetch buffer 120(2) to determine whether the second sub-portion has been fully loaded such that the replay operation 300 may immediately proceed to replaying the second sub-portion upon completion of the first sub-portion. Here, the second prefetch buffer 120(2) has fully loaded the second sub-portion and, therefore, the prefetch manager 118 has designated this prefetch buffer with a full buffer indication (graphically illustrated as a check). As illustrated in FIG. 3, the magnifying glass symbol indicates that the prefetch manager 118 is currently analyzing a particular prefetch buffer 120 at the indicated point in time. For example, at T=1.5 the prefetch manager is currently analyzing each of the third prefetch buffer 120(3) and the fourth prefetch buffer 120(4).

At time T=1.7, the replay operation 300 has just begun processing the second sub-portion as indicated by the processor symbol and the corresponding progress-arrow 304(2). Furthermore, the prefetch manager 118 has finished analyzing each of the third prefetch buffer 120(3) and the fourth prefetch buffer 120(4) and is currently analyzing the fifteenth prefetch buffer 120(15) and the sixteenth prefetch buffer 120(16). As illustrated, the prefetch manager 118 has designated the third prefetch buffer 120(3) with a full buffer indication but has designated the fourth prefetch buffer 120(4) with a partial buffer indication (graphically illustrated as an "X") to indicate that this prefetch buffer has not fully loaded its corresponding sub-portion, i.e. the fourth sub-portion. In some implementations, the prefetch manager 118 may be configured to issue supplemental read instructions based on an individual prefetch buffer failing to timely load a corresponding sub-portion. For example, as illustrated, at T=1.7 the fourth prefetch buffer 120(4) has only successfully loaded the first two MB of its sub-portion while failing to load the remaining final two MB of its sub-portion, e.g. a system glitch or anomalous events may have caused this prefetch buffer to timeout prior to completion of its read assignment. As illustrated, the prefetch manager 118 has issued a supplemental read instruction directly back to the fourth prefetch buffer 120(4) instructing this prefetch buffer to read the remaining two MB (e.g. the fourteenth through sixteenth MB of data). In some implementations, the prefetch manager 118 may issue supplemental read instructions to one or more individual prefetch buffers other than the individual prefetch buffer originally receiving the corresponding read assignment. For example, although not illustrated, the prefetch manager 118 may have issued the supplemental read instruction to the first prefetch buffer 120(1) to enlist the first prefetch buffer to assist the fourth prefetch buffer 120(4) or to take over the fourth prefetch buffer's duties entirely.

Also at time T=1.7, the prefetch manager 118 has issued a new read instruction RI(17) to the first prefetch buffer 120(1) due to the replay operation 300 having completed replaying the subset of transactions corresponding to the initial read instruction RI(1).

At time T=2.1, the replay operation 300 has nearly completed processing the second sub-portion as indicated by the progress-arrow 304(2). Furthermore, as the third prefetch buffer 120(3) has already been designated with a full buffer indication, the prefetch manager 118 has cleared the replay operation 300 to begin processing the third sub-portion from the third prefetch buffer 120(3) immediately upon completing the second sub-portion. Furthermore, having received the supplemental read instruction, the fourth prefetch buffer 120(4) has been caused to reinitiate its read operation to load the remaining two MBs of its read assignment.

At time T=2.6, the replay operation 300 has begun processing the third sub-portion as indicated by the processor symbol and the corresponding progress-arrow 304(3). Furthermore, the prefetch manager 118 is currently reanalyzing the fourth prefetch buffer 120(4) and is also analyzing the first prefetch buffer 120(1). Furthermore, as the replay operation 300 has finished processing the third sub-portion, the prefetch manager 118 has issued another new read instruction RI(18) to the second prefetch buffer 120(2).

At time T=9.3, the replay operation 300 has finished processing the sixteenth sub-portion and, therefore, the prefetch manager 118 has issued another new read instruction RI(32) to the sixteenth prefetch buffer 120(16). As further illustrated, the replay operation has begun processing seventeenth sub-portion from the first prefetch buffer 120(1) as indicated by the processor symbol and the corresponding progress-arrow 304(17). Accordingly, it can be appreciated that the replay operation 300 may resemble an iterative loop operation to sequentially process portions of log stream transaction data that are greater than an aggregate amount of prefetch buffer storage by parsing the portions into more manageable sub-portions. For example, according to the present assumptions and system parameters, the aggregate amount of prefetch buffer storage is equal to 67.2 MB (e.g. 4.2 MB times sixteen individual prefetch buffers) whereas the relevant portion of the log stream transaction data is equal to three-hundred MB.

Figure 4:
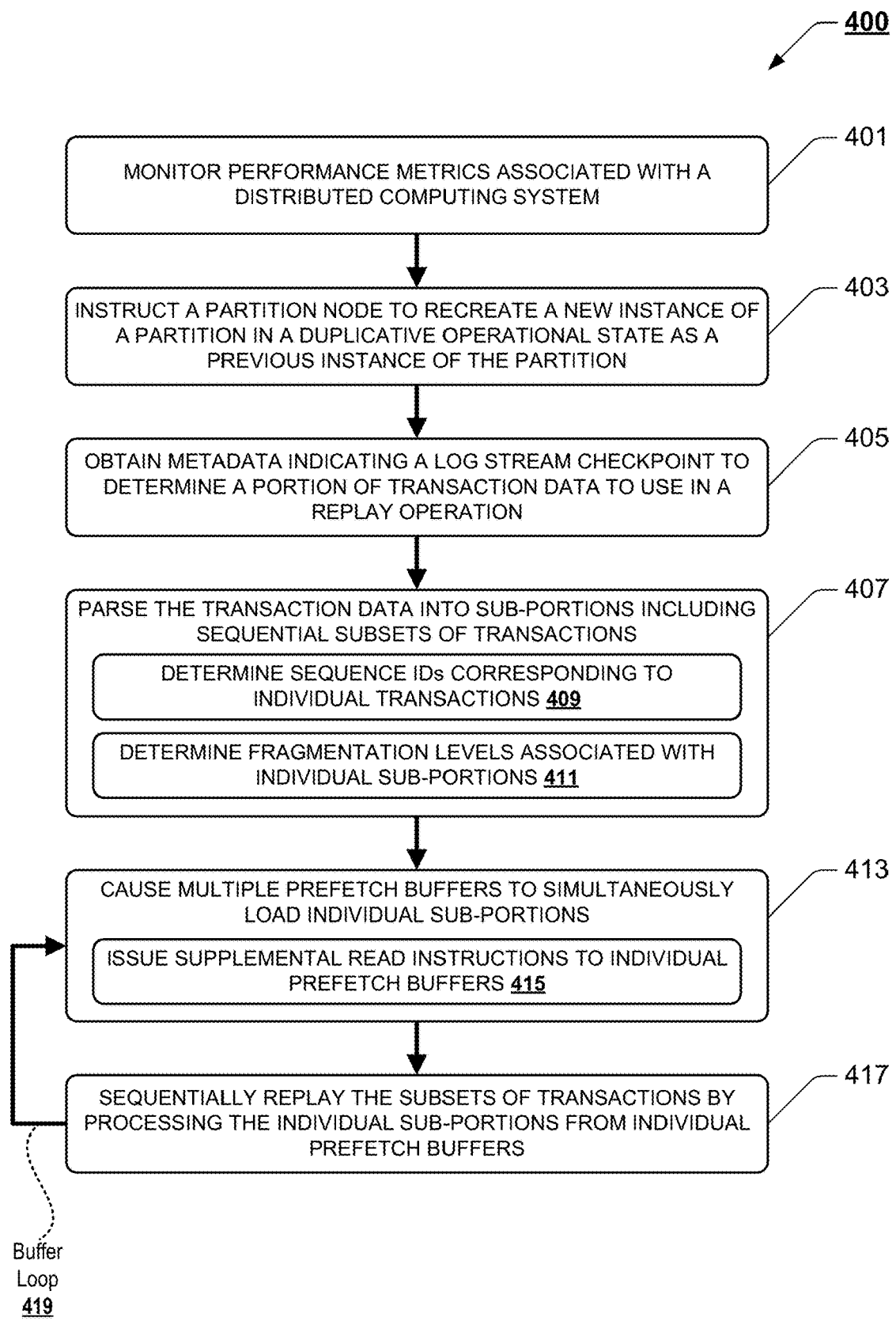
FIG. 4 is a flow diagram of a process to prefetch metadata stream sub-portions and/or log stream sub-portions to re-create a partition state in a distributed computing system.

Turning now to FIG. 4, a flow diagram is illustrated of a process 400 to prefetch log stream sub-portions to re-create a partition state in a distributed computing system. The process 400 is described with reference to FIGS. 1-3. The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 401, a system may monitor performance metrics associated with a distributed computing system. In some implementations, the system may monitor performance metrics on an individual node basis. For example, as illustrated in FIG. 2, the system may include a partition master 112 that is configured to monitor first performance metrics 212(1) corresponding to a first partition node 114(1), second performance metrics 212(2) corresponding to a second partition node 114(2), and so on. In some implementations, the system may monitor performance metrics on an individual partition basis. For example, the partition master 112 may be configured to monitor a performance of the partition $P_1$ and the partition $P_5$ while each are operating on the first partition node 114(1) and, may identify that the partition $P_5$ has become slow to respond and/or nonresponsive to transaction requests 206 that are issued by the application 102. As a more specific but nonlimiting example, the partition master 212 may determine that the partition $P_5$ has crashed on the first partition node 114(1).

At block 403, the system may instruct a particular partition node to re-create a new instance of a partition in an operational state that is duplicative of a previous instance of the partition. For example, as illustrated in FIG. 2, the system may issue one or more instructions 214 to cause a particular partition node to re-create a new instance of the partition $P_5$. In some implementations, the one or more instructions 214 issued at block 403 may be based upon the performance metrics associated with block 401. For example, the partition master 112 may identify that the partition $P_5$ has crashed at the first partition node 114(1) and, based thereon, the partition master 112 may issue the first command 214(1) to cause the first partition node 114(1) to cease operation of the partition $P_5$ and the second command 214(2) to cause the second partition node 114(2) to begin operation of a new instance of the partition $P_5$ and furthermore to bring the new instance of the partition $P_5$ into an operational state that is duplicative of the last operational state recorded by the combination of the metadata $M_5$ and the log stream of transactions $LS_5$.

At block 405, the system may obtain metadata that indicates a log stream checkpoint that enables the system to determine a portion of transaction data to use in a replay operation. For example, as illustrated in FIG. 2, a prefetch manager 118 may obtain the metadata $M_5$ from one or more stream nodes 126. In some configurations, the metadata may fully indicate a plurality of data object states corresponding to a plurality of data objects of the partition such that, based solely on the metadata, the system can bring a new instance of the partition into a previous operational state. Upon receiving the metadata, the system may analyze the metadata to identify the checkpoint of the log stream of transactions associated with the partition. Then, based on the checkpoint, the system may identify a portion of the transaction data that includes a plurality of transactions that have occurred subsequent to this previous operational state and have resulted in a desired operational state, i.e. an operational state resulting from the plurality of transactions being performed with respect to the partition once it has been brought into the previous operational state. As described elsewhere herein, this "portion" of the transaction data may correspond to a plurality of transactions that are "New" in the sense that these transactions are not reflected in the object states indicated by the metadata.

At block 407, the system may parse the transaction data into a plurality of sub-portions of transaction data wherein the individual sub-portions include sequential subsets of transactions of the plurality of transactions. As used herein, the term "portions" used in the context of portions of the transaction data may refer generally to an amount of data (e.g. in terms of data size such as, for example, bytes, kilobytes, megabytes) that is associated with a particular subset of transactions. For example, a portion of the transaction data may correspond to a particular four MB chuck of the transaction data. As used herein, the term "subset" used in the context of subsets of the plurality of transactions may refer generally to a discrete number of transactions. A subset of the plurality of transactions may correspond to a specific one-thousand of the plurality of transactions, e.g. transactions $TXN_{1001}$ through $TXN_{2000}$.

As indicated by block 409, parsing the transaction data at block 407 may include determining sequence IDs corresponding to individual transactions. Then, the system may determine the sub-portions of transaction data based at least partially on the sequence IDs. In some implementations, the system may parse the transaction data into sub-portions that each include a substantially equal number of transactions. For example, the system may be configured to parse the transaction data into sub-portions that each include a corresponding subset of one-hundred transactions with a final sub-portion including a subset of a remainder of transactions if the plurality of transactions is not a multiple of one-hundred.

As indicated by block 411, parsing the transaction data at block 407 may include determining fragmentation levels associated with individual sub-portions. Then, the system may determine data sizes corresponding to individual sub-portions based upon the fragmentation levels. For example, the system may determine that a first sub-portion of transaction data is highly fragmented (e.g. distributed across numerous nodes and/or stored on one or more disks in large amounts of relatively small fragment sizes) whereas a second sub-portion of the transaction data is highly consolidated (e.g. distributed across a single/small number of nodes and/or stored on a single disc as a single data fragment). It can be appreciated that a fragmentation level associated with a portion of data may have an effect on the rate at which such a portion of data can be obtained, e.g. loaded into a particular prefetch buffer 120. For example, if a first prefetch buffer is instructed to read a highly fragmented four MB portion of transaction data whereas a second prefetch buffer is instructed to read a highly consolidated four MB of transaction data, then all other things being equal the first prefetch buffer will likely need more time to fully read the highly-fragmented portion. Accordingly, in some implementations, the system may be configured to determine data sizes corresponding to individual sub-portions based at least partially on the fragmentation levels for the purpose of managing loading times corresponding to the individual sub-portions.

At block 413, the system may cause multiple prefetch buffers to simultaneously load individual sub-portions of the transaction data. For example, as illustrated in FIG. 3, the system may issue a plurality of read instructions that each individually correspond to an individual sub-portion of the transaction data.

As indicated by block 415, causing prefetch buffers to load sub-portions of the transaction data may include issuing supplemental read instructions to individual prefetch buffers. For example, as illustrated in FIG. 3, the system may determine when a particular prefetch buffer has failed to timely load a sub-portion corresponding to a particular read instruction. In some implementations, the system may identify one or more data fragments of a particular sub portion that have yet to be loaded into a particular prefetch buffer. Then, the system may issue a supplemental read instruction with respect to the one or more data fragments. In some implementations, the system may issue the supplemental read instruction back to the same prefetch buffer which was originally instructed to load the one or more data fragments. For example, as illustrated in FIG. 3, in response to the fourth prefetch buffer 120(4) failing to load one or more data fragments corresponding to the last two MB of data of the four MB sub-portion corresponding to read instruction four RI(4), the system has issued the supplemental read instruction back to the fourth prefetch buffer 120(4). In some implementations, the system may issue the supplemental read instruction to a prefetch buffer that is different than the prefetch buffer originally instructed to load the one or more data fragments. For example, in an alternative scenario to that illustrated in FIG. 3, the system could have issued the illustrated supplemental read instruction (e.g. labeled "Supp. RI) to the first prefetch buffer 120(1) at time T=1.7. Accordingly, in some implementations the system may be configured to instruct particular prefetch buffers to assist other prefetch buffers in instances one particular sub-portions of transaction data are not timely loaded.

At block 417, the system may sequential replay the subsets of transactions by processing the individual sub-portions that have been loaded onto the individual prefetch buffers 120. For example, as illustrated in FIG. 3, system may replay a first subset that has been loaded onto the first prefetch buffer 120(1), and then once finished with replaying the first subset the system may commence replaying a second subset that has been loaded onto the second prefetch buffer 120(2) and so on.

As indicated by the buffer loop 419, in implementations where an aggregate amount of buffer storage is less than a data size corresponding to the relevant portion of transaction data, the system may iteratively loop between blocks 413 and 417 until the replay operation has completed. Stated alternatively, when the system finishes replaying individual subsets of the transactions corresponding to a particular read instruction issued to a particular prefetch buffer, the system may issue the particular prefetch buffer a different read instruction to cause the prefetch buffer to load a different sub portion of the transaction data. For example, as illustrated in FIG. 3, when the system begins replaying the second subset after having finished replaying the first subset, the system may issue a new read instruction to the first prefetch buffer 120(1).

Figure 5:
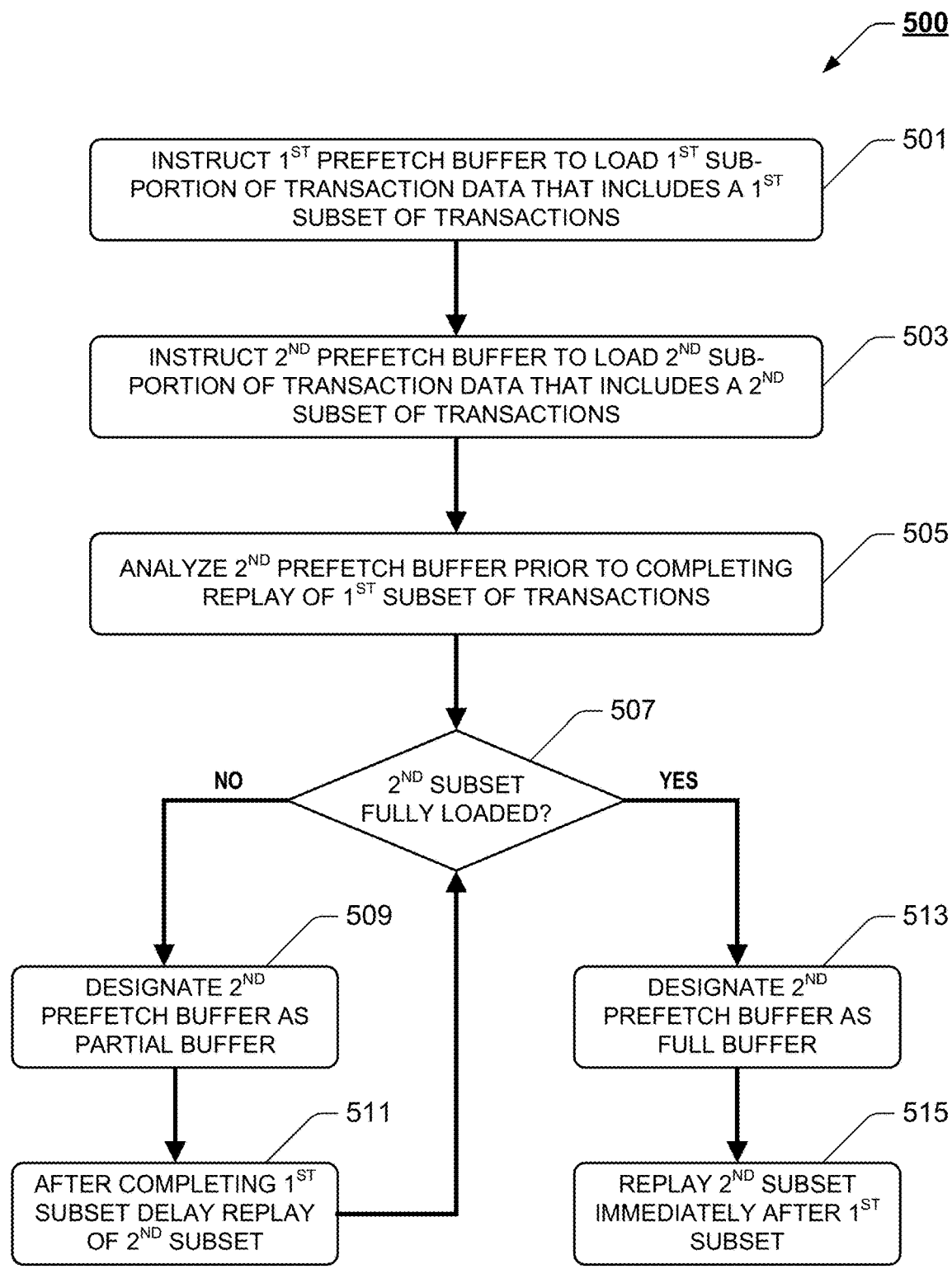
FIG. 5 is a flow diagram of a process to analyzing individual prefetch buffers to determine whether a corresponding transaction subset is fully loaded before an earlier transaction subset is finished being replayed to a partition.

Turning now to FIG. 5, a flow diagram is illustrated of a process 500 to analyzing individual prefetch buffers to determine whether a corresponding transaction subset is fully loaded before an earlier transaction subset is finished being replayed to a partition.

At block 501, a system may instruct a first prefetch buffer to load a first sub-portion of transaction data that lists the first subset of transactions. For example, the prefetch manager 118 may instruct the first prefetch buffer 120(1) to load an initial four MB of transaction data of the relevant portion of the log stream of transactions and/or the metadata stream of transactions. For purposes of the discussion of FIG. 5, assume that the initial four MB of transaction data lists a subset of transactions ranging from $TXN_{3,001}$ through $TXN_{4,000}$.

At block 503, a system may instruct a second prefetch buffer to load a second sub-portion of transaction data that lists a second subset of transactions. For example, the prefetch manager 118 may instruct the second prefetch buffer 120(2) to load the next four MB of transaction data of the relevant portion of the luxury transactions. For purposes of the present discussion of FIG. 5, assume that the next four MB of transaction data lists a subset of transactions ranging from $TXN_{4,001}$ through $TXN_{5,000}$. Accordingly, it can be appreciated that the first subset of transactions and second subset of transactions are immediately sequential in the sense that the final transaction of the first subset (i.e. $TXN_{4,000}$) immediately precedes the initial transaction of the second subset (i.e. $TXN_{4,001}$).

At block 505, the system may analyze the second prefetch buffer prior to completing replay of the first subset of transactions. At decision block 507, the system may determine whether the second prefetch buffer has fully loaded the second subset of transactions.

Based on a determination that the second prefetch buffer has not fully loaded the second subset of transactions, the process 500 may proceed to block 509 at which the second prefetch buffer is designated as a partial buffer to inform system components that a replay of the second subset is not yet ready to be commenced. Then, at block 511, the system may delay a replay of the second subset of transaction after completing a replay of the first subset of transactions based on the designation put on the second prefetch buffer at block 509. Ultimately, the process 500 may iteratively loop back to decision block 507 thereby causing the system to delay commencing a replay of the second subset of transactions until such time as the second subset of transactions is fully loaded onto the second prefetch buffer and/or a third prefetch buffer.

Based on a determination that the second prefetch buffer has fully loaded the second subset of transactions, the process may proceed from block 507 to block 513 at which the second prefetch buffer is designated as a full buffer to inform system components that a replay of the second subset is ready to be commenced. Then, at block 515, the system may immediately commence a replay of the second subset after completing a replay of the first subset of transactions based on the designation put on the second prefetch buffer at block 513.

Figure 6:
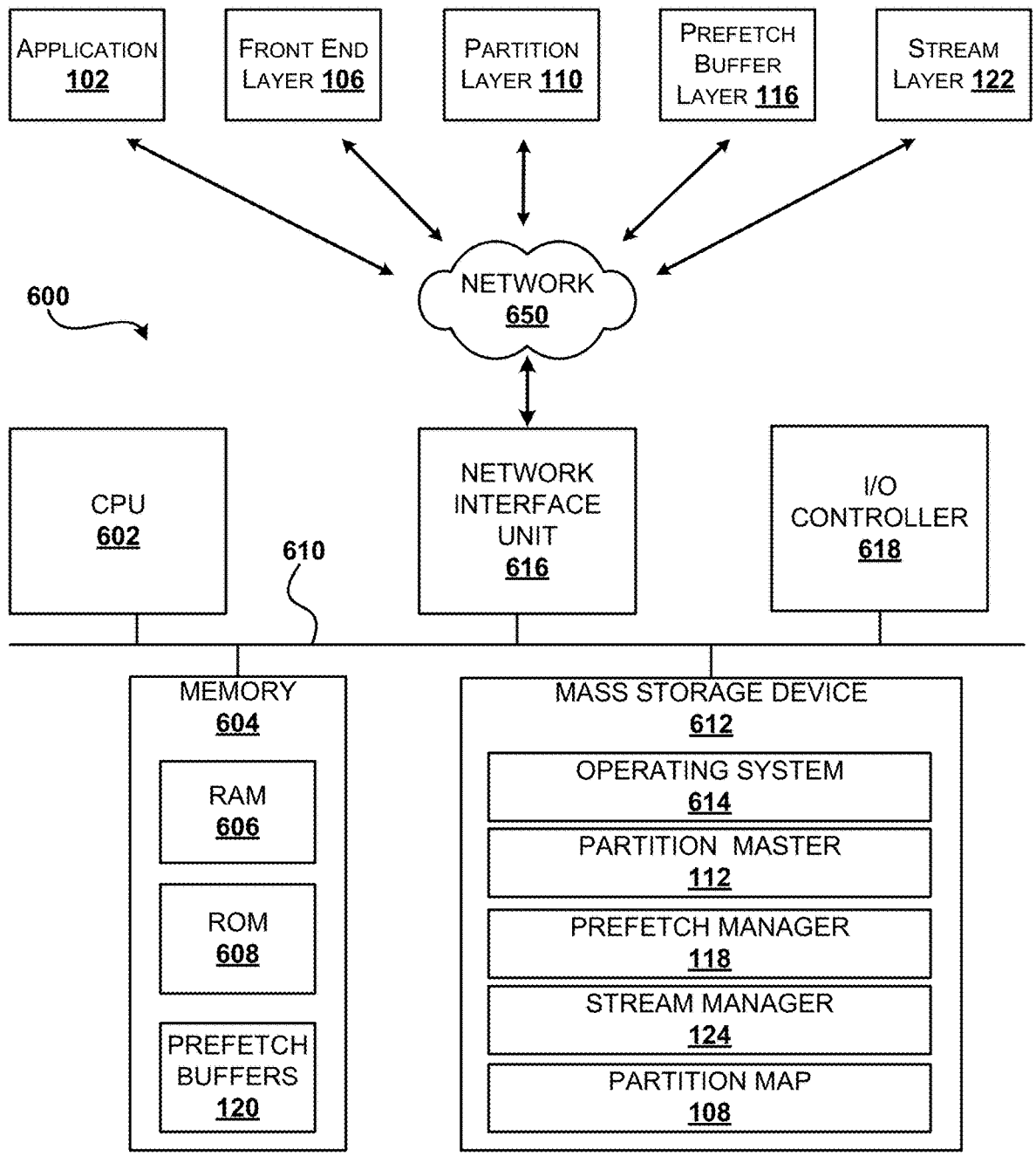
FIG. 6 shows additional details of an example computer architecture for a computer capable of executing the functionalities described herein.

FIG. 6 shows additional details of an example computer architecture 600 for a computer capable of executing the partition Master 112, prefetch manager 118, stream manager 124, partition map 108, and/or any program components thereof as described herein. Thus, the computer architecture 600 illustrated in FIG. 6 illustrates an architecture for a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608 and the plurality of prefetch buffers 120 described herein, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the partition master 112, the prefetch manager 118, the stream manager 124, and/or the partition map 108.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 650 and/or another network (not shown). The computer architecture 600 may connect to the network 650 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 650 through a network interface unit 616, the computing architecture may enable communication between the functional components described herein.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Example Clauses

The disclosure presented herein may be considered in view of the following clauses.

Example Clause A, a system for prefetching log stream sub-portions to recreate partition states in a distributed computing system, the system comprising: one or more processors; and a memory in communication with the one or more processors, the memory having computer-readable instructions stored thereupon that, when executed by the one or more processors implement a partition master and a prefetch manager: the partition master configured to: monitor performance metrics corresponding to a first node that is operating a partition in association with at least one application, wherein an operational state of the partition corresponds to a plurality of transactions that have occurred subsequent to a previous operational state of the partition; and instruct, based at least in part on the performance metrics, a second node to recreate the operational state of the partition, with respect to the at least one application, by sequentially replaying the plurality of transactions to a new instance of the partition that is in the previous operational state; and the prefetch manager configured to: obtain metadata corresponding to the previous operational state of the partition; analyze the metadata to identify a checkpoint of a log stream associated with the partition, wherein the checkpoint indicates an initial transaction of a portion of the log stream that sequentially lists the plurality of transactions; determine, based at least in part on the checkpoint, a plurality of sub-portions of the portion of the log stream that sequentially lists the plurality of transactions wherein the plurality of sub-portions sequentially forms the portion of the log stream that sequentially lists the plurality of transactions; and cause individual prefetch buffers, of a plurality of prefetch buffers, to simultaneously load individual sub-portions, of the plurality of sub-portions, to enable the second node to sequentially replay the plurality of transactions to the new instance of the partition.

Example Clause B, the system of Example Clause A, wherein the prefetch manager is further configured to: instruct a first prefetch buffer to load a first sub-portion, of the plurality of sub-portions, that sequentially lists a first subset of the plurality of transactions; and instruct a second prefetch buffer to load a second sub-portion, of the plurality of sub-portions, that sequentially lists a second subset of the plurality of transactions, wherein the second node is configured to begin replaying the second subset to the new instance of the partition after successfully replaying the first subset to the new instance of the partition.

Example Clause C, the system of any one of Example Clauses A through B, wherein the prefetch manager is further configured to: identify one or more data fragments, of the second sub-portion, that have not been loaded to the second prefetch buffer; and instruct at least one of the second prefetch buffer or a third prefetch buffer to load the one or more data fragments.

Example Clause D, the system of any one of Example Clauses A through C, wherein the prefetch manager is further configured to, based at least in part on a determination that the second node has finished replaying the first subset to the new instance of the partition, cause the first prefetch buffer to load a third sub-portion, of the plurality of sub-portions, that sequentially lists a third subset of the plurality of transactions, wherein the second subset is immediately subsequent to the first subset, and wherein the third subset is subsequent the second subset.

Example Clause E, the system of any one of Example Clauses A through D, wherein the operational state of the partition is based at least partially on a plurality of data object states, corresponding to a plurality of data objects, associated with the at least one application, and wherein the metadata indicates at least some of the plurality of data object states.

Example Clause F, the system of any one of Example Clauses A through E, wherein the operational state of the partition further corresponds to a second plurality of transactions that have occurred prior to the previous operational state, wherein the metadata sequentially lists the second plurality of transactions, and wherein the prefetch manager is further configured to cause the individual prefetch buffers to load the second plurality of transactions to enable the second node to sequentially replay the second plurality of transactions to the new instance to change the new instance into the previous operational state.

Example Clause G, the system of any one of Example Clauses A through F, wherein the prefetch manager is further configured to: identify one or more data fragments of the portion of the log stream to determine fragmentation levels associated with the plurality of sub-portions; and determine data sizes for the individual sub-portions based at least in part on the fragmentation levels.

While Example Clauses A through G are described above with respect to a system, it is understood in the context of this document that the subject matter of Example Clauses A through G can also be implemented by a device, via a computer-implemented method, and/or via computer-readable storage media.

Example Clause H, a computer-implemented method, comprising: receiving an instruction to generate, at a second node, a new instance of a partition in an operational state that is duplicative of a previous instance of the partition at a first node, the operational state resulting from a plurality of transactions occurring subsequent to a previous operational state of the partition; analyzing metadata, corresponding to the previous operational state, to identify a checkpoint of a log stream of transactions that have occurred with respect to the previous instance of the partition at the first node; determining, based at least in part on the checkpoint, a plurality of sequence identifiers (IDs) associated with a portion of the log stream that corresponds to the plurality of transactions, wherein individual sequence IDs of the plurality of sequence IDs correspond to individual transactions of the plurality of transactions; parsing the portion of the log stream into a plurality of sub-portions based at least partially on the plurality of sequence IDs; causing individual prefetch buffers, of a plurality of prefetch buffers, to simultaneously load individual sub-portions of the plurality of sub-portions; causing the new instance of the partition to enter the previous operational state at the second node; and transforming, at the second node, the new instance of the partition into the operational state by replaying, to the new instance of the partition in the previous operational state, the plurality of transactions by sequentially processing the individual sub-portions according to the plurality of sequence IDs.

Example Clause I, the computer-implemented method of Example Clause H, the computer-implemented method of claim 8, further comprising: causing a first prefetch buffer to load a first sub-portion, of the plurality of sub-portions, that lists a first subset of the plurality of transactions, wherein a final transaction of the first subset corresponds to a first sequence ID of the plurality of sequence IDs; causing a second prefetch buffer to load a second sub-portion, of the plurality of sub-portions, that lists a second subset of the plurality of transactions, wherein an initial transaction of the second subset corresponds to a second sequence ID, of the plurality of sequence IDs, that is immediately subsequent to the first sequence ID; and replaying the initial transaction from the second prefetch buffer immediately subsequent to replaying the final transaction from the first prefetch buffer.

Example Clause J, the computer-implemented method of any one of Example Clauses H through I, further comprising: determining that the second prefetch buffer has loaded a first plurality of data fragments of the second sub-portion and has not loaded a second plurality of data fragments of the second sub-portion; instructing a third prefetch buffer to load the second plurality of data fragments; and processing the second plurality of data fragments from the third prefetch buffer immediately subsequent to processing the first plurality of data fragments from the second prefetch buffer.

Example Clause K, the computer-implemented method of any one of Example Clauses H through J, further comprising: instructing a first prefetch buffer to load a first sub-portion, of the plurality of sub-portions, that lists a first subset of the plurality of transactions; instructing a second prefetch buffer to load a second sub-portion, of the plurality of sub-portions, that lists a second subset of the plurality of transactions; analyzing, prior to completely replaying the first subset, the second prefetch buffer to determine whether the second prefetch buffer has fully loaded the second subset to: designating the second prefetch buffer as a full buffer based at least in part on a determination that the second prefetch buffer has fully loaded the second subset, or designating the second prefetch buffer as a partial buffer based at least in part on a determination that the second prefetch buffer has not fully loaded the second subset.

Example Clause L, the computer-implemented method of any one of Example Clauses H through K, further comprising: commencing replay of the second subset immediately subsequent to completely replaying the first subset based at least in part on the second prefetch buffer being designated as the full buffer; or delaying replay of the second subset subsequent to completely replaying the first subset based at least in part on the second prefetch buffer being designated as the partial buffer.

Example Clause M, the computer-implemented method of any one of Example Clauses H through L, wherein parsing the portion of the log stream into the plurality of sub-portions includes determining a plurality of sequence ID groupings that result in the individual sub-portions substantially conforming to a predetermined data size.

Example Clause N, the computer-implemented method of any one of Example Clauses H through M, further comprising: analyzing the metadata to identify a second plurality of transactions that have occurred, at the first node, with respect to the previous instance of the partition to result in the previous operational state; parsing the second plurality of transactions into a second plurality of sub-portions based at least partially on the plurality of sequence IDs; and causing the individual prefetch buffers to load second individual sub-portions of the second plurality of sub-portions, wherein causing the new instance to enter the previous operational state include sequentially processing the second individual sub-portions according to the plurality of sequence IDs.

Example Clause O, the computer-implemented method of any one of Example Clauses H through N, further comprising analyzing the metadata to identify, for a plurality of data objects, a plurality of data object states that correspond to the previous operational state of the partition, and wherein causing the new instance to enter the previous operational state includes causing individual data objects of the plurality of data objects to enter a corresponding individual data object state of the plurality of data object states.

While Example Clauses H through N are described above with respect to a method, it is understood in the context of this document that the subject matter of Example Clauses H through N can also be implemented by a device, by a system, and/or via computer-readable storage media.

Example Clause P, a system, comprising: one or more processors; and a memory in communication with the one or more processors, the memory having computer-readable instructions stored thereupon that, when executed by the one or more processors, cause the one or more processors to: receive an instruction to generate a new instance of a partition in an operational state that is duplicative of a previous instance of the partition; analyze metadata to identify a plurality of transactions that have occurred with respect to a previous operational state of the previous instance to result in the previous instance entering the operational state, wherein individual transactions of the plurality of transactions correspond to individual sequence identifiers (IDs); parse the plurality of transactions into a plurality of subsets of transactions that includes at least: a first subset of transactions, and a second subset of transactions that is subsequent to the first subset of transactions; cause individual prefetch buffers, of a plurality of prefetch buffers, to simultaneously load individual subsets of transactions of the plurality of subsets of transactions; based at least in part on a determination that a first prefetch buffer has completely loaded the first subset of transactions, commence replay of the first subset of transactions to the new instance while the new instance is in the previous operational state and prior to a second prefetch buffer fully loading the second subset of transactions.

Example Clause Q, the system of Example Clause P, wherein the computer-executable instructions further cause the one or more processors to: analyze the second prefetch buffer to make a second determination that the second prefetch buffer has completely loaded the second subset of transactions, wherein an initial transaction of the second subset of transactions corresponds to a first individual sequence ID; and based at least in part on the second determination, commence replay of the second subset of transactions to the new instance immediately subsequent to completing replay of a particular transaction that corresponds to a second individual sequence ID that immediately precedes the first individual sequence ID.

Example Clause R, the system of any one of Example Clauses P through Q, wherein the computer-executable instructions further cause the one or more processors to cause the first prefetch buffer to load a third subset of transactions that is subsequent to the second subset of transactions based at least in part on a second determination that the first subset of transactions has been completely replayed to the new instance of the partition.

Example Clause S, the system of any one of Example Clauses P through R, wherein the second subset of transactions is immediately subsequent to the first subset of transactions, and wherein the plurality of intervening subsets of transactions separate the third subset of transactions from the second subset of transactions.

Example Clause T, the system of any one of Example Clauses P through S, wherein the computer-executable instructions further cause the one or more processors to: determine transaction replica distributions associated replications of the plurality of transactions stored across the plurality of stream nodes; and generate a plurality of read instructions based at least in part on the transaction replica distributions.

While Example Clauses P through T are described above with respect to a system, it is understood in the context of this document that the subject matter of Example Clauses P through T can also be implemented by a device, via a computer-implemented method, and/or via computer-readable storage media.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for prefetching log stream sub-portions to recreate partition states in a distributed computing system, the system comprising:
one or more processors; and
a memory in communication with the one or more processors, the memory having computer-readable instructions stored thereupon that, when executed by the one or more processors implement a partition master and a prefetch manager:
the partition master configured to:
monitor performance metrics corresponding to a first node that is operating a partition in association with at least one application, wherein an operational state of the partition corresponds to a plurality of transactions that have occurred subsequent to a previous operational state of the partition; and
instruct, based at least in part on the performance metrics, a second node to recreate the operational state of the partition, with respect to the at least one application, by sequentially replaying the plurality of transactions to a new instance of the partition that is in the previous operational state; and
the prefetch manager configured to:
obtain metadata corresponding to the previous operational state of the partition;
analyze the metadata to identify a checkpoint of a log stream associated with the partition, wherein the checkpoint indicates an initial transaction of a portion of the log stream that sequentially lists the plurality of transactions;
determine, based at least in part on the checkpoint, a plurality of sub-portions of the portion of the log stream that sequentially lists the plurality of transactions, wherein the plurality of sub-portions sequentially forms the portion of the log stream that sequentially lists the plurality of transactions; and
cause individual prefetch buffers, of a plurality of prefetch buffers, to simultaneously load individual sub-portions, of the plurality of sub-portions, to enable the second node to sequentially replay the plurality of transactions to the new instance of the partition, wherein the second node begins to sequentially replay the plurality of transactions subsequent to an initial sub-portion, of the plurality of sub-portions, being loaded into a first prefetch buffer and prior to at least one other sub-portion, of the plurality of sub-portions, being loaded into at least one other prefetch buffer.

2. The system of claim 1, wherein the prefetch manager is further configured to:
instruct the first prefetch buffer to load the initial sub-portion, wherein the initial sub-portion sequentially lists a first subset of the plurality of transactions; and
instruct the at least one other prefetch buffer to load the at least one other sub-portion, wherein the at least one other sub-portion sequentially lists a second subset of the plurality of transactions, and wherein the second node is configured to begin replaying the second subset to the new instance of the partition after successfully replaying the first subset to the new instance of the partition.

3. The system of claim 2, wherein the prefetch manager is further configured to:
identify one or more data fragments, of the at least one other sub-portion, that have not been loaded to a second prefetch buffer; and
instruct at least one of the second prefetch buffer or a third prefetch buffer to load the one or more data fragments.

4. The system of claim 2, wherein the prefetch manager is further configured to:
based at least in part on a determination that the second node has finished replaying the first subset to the new instance of the partition, cause the first prefetch buffer to load a third sub-portion, of the plurality of sub-portions, that sequentially lists a third subset of the plurality of transactions, wherein the second subset is immediately subsequent to the first subset, and wherein the third subset is subsequent the second subset.

5. The system of claim 1, wherein the operational state of the partition is based at least partially on a plurality of data object states, corresponding to a plurality of data objects, associated with the at least one application, and wherein the metadata indicates at least some of the plurality of data object states.

6. The system of claim 1, wherein the operational state of the partition further corresponds to a second plurality of transactions that have occurred prior to the previous operational state, wherein the metadata sequentially lists the second plurality of transactions, and wherein the prefetch manager is further configured to cause the individual prefetch buffers to load the second plurality of transactions to enable the second node to sequentially replay the second plurality of transactions to the new instance to change the new instance into the previous operational state.

7. The system of claim 1, wherein the prefetch manager is further configured to:
identify one or more data fragments of the portion of the log stream to determine fragmentation levels associated with the plurality of sub-portions; and
determine data sizes for the individual sub-portions based at least in part on the fragmentation levels.

8. A computer-implemented method, comprising:
receiving an instruction to generate, at a second node, a new instance of a partition in an operational state that is duplicative of a previous instance of the partition at a first node, the operational state resulting from a plurality of transactions occurring subsequent to a previous operational state of the partition;
analyzing metadata, corresponding to the previous operational state, to identify a checkpoint of a log stream of transactions that have occurred with respect to the previous instance of the partition at the first node;
determining, based at least in part on the checkpoint, a plurality of sequence identifiers (IDs) associated with a portion of the log stream that corresponds to the plurality of transactions, wherein individual sequence IDs of the plurality of sequence IDs correspond to individual transactions of the plurality of transactions;
parsing the portion of the log stream into a plurality of sub-portions based at least partially on the plurality of sequence IDs;
causing individual prefetch buffers, of a plurality of prefetch buffers, to simultaneously load individual sub-portions of the plurality of sub-portions;
causing the new instance of the partition to enter the previous operational state at the second node; and
transforming, at the second node, the new instance of the partition into the operational state by replaying, to the new instance of the partition in the previous operational state, the plurality of transactions by sequentially processing the individual sub-portions according to the plurality of sequence IDs, wherein the sequentially processing includes processing a first sub-portion, of the plurality of sub-portions, from a first prefetch buffer prior to at least one other sub-portion, of the plurality of sub-portions, being fully loaded into at least one other prefetch buffer.

9. The computer-implemented method of claim 8,
wherein a final transaction of the first sub-portion corresponds to a first sequence ID of the plurality of sequence IDs, and wherein an initial transaction of the second sub-portion corresponds to a second sequence ID, of the plurality of sequence IDs, that is immediately subsequent to the first sequence ID, and wherein
the initial transaction is replayed from the second prefetch buffer immediately subsequent to the final transaction being replayed from the first prefetch buffer.

10. The computer-implemented method of claim 9, further comprising:
determining that the second prefetch buffer has loaded a first plurality of data fragments of a second sub-portion and has not loaded a second plurality of data fragments of the second sub-portion;
instructing a third prefetch buffer to load the second plurality of data fragments; and
processing the second plurality of data fragments from the third prefetch buffer immediately subsequent to processing the first plurality of data fragments from the second prefetch buffer.

11. The computer-implemented method of claim 8 further comprising:
prior to completely replaying the first sub-portion, analyzing the second prefetch buffer to determine whether the second prefetch buffer has fully loaded the second sub-portion to:
designate the second prefetch buffer as a full buffer based at least in part on a determination that the second prefetch buffer has fully loaded the second sub-portion, or
designate the second prefetch buffer as a partial buffer based at least in part on a determination that the second prefetch buffer has not fully loaded the second sub-portion.

12. The computer-implemented method of claim 11, further comprising:
commencing replay of the second sub-portion immediately subsequent to completely replaying the first sub-portion subset based at least in part on the second prefetch buffer being designated as the full buffer; or
delaying replay of the second sub-portion subsequent to completely replaying the first sub-portion based at least in part on the second prefetch buffer being designated as the partial buffer.

13. The computer-implemented method of claim 8, wherein parsing the portion of the log stream into the plurality of sub-portions includes determining a plurality of sequence ID groupings that result in the individual sub-portions substantially conforming to a predetermined data size.

14. The computer-implemented method of claim 8, further comprising:
analyzing the metadata to identify a second plurality of transactions that have occurred, at the first node, with respect to the previous instance of the partition to result in the previous operational state;
parsing the second plurality of transactions into a second plurality of sub-portions based at least partially on the plurality of sequence IDs; and
causing the individual prefetch buffers to load second individual sub-portions of the second plurality of sub-portions, wherein causing the new instance to enter the previous operational state includes sequentially processing the second individual sub-portions according to the plurality of sequence IDs.

15. The computer-implemented method of claim 8, further comprising analyzing the metadata to identify, for a plurality of data objects, a plurality of data object states that correspond to the previous operational state of the partition, and wherein causing the new instance to enter the previous operational state includes causing individual data objects of the plurality of data objects to enter a corresponding individual data object state of the plurality of data object states.

16. A system, comprising:
one or more processors; and
a memory in communication with the one or more processors, the memory having computer-readable instructions stored thereupon that, when executed by the one or more processors, cause the one or more processors to:
receive an instruction to generate a new instance of a partition in an operational state that is duplicative of a previous instance of the partition;
analyze metadata to identify a plurality of transactions that have occurred with respect to a previous operational state of the previous instance to result in the previous instance entering the operational state, wherein individual transactions of the plurality of transactions correspond to individual sequence identifiers (IDs);
parse the plurality of transactions into a plurality of subsets of transactions that includes at least: a first subset of transactions, and a second subset of transactions that is subsequent to the first subset of transactions;
cause individual prefetch buffers, of a plurality of prefetch buffers, to simultaneously load individual subsets of transactions of the plurality of subsets of transactions; and
based at least in part on a determination that a first prefetch buffer has completely loaded the first subset of transactions, commence replay of the first subset of transactions to the new instance while the new instance is in the previous operational state and prior to a second prefetch buffer fully loading the second subset of transactions.

17. The computer-readable storage medium of claim 16, wherein the computer-executable instructions further cause the one or more processors to:
analyze the second prefetch buffer to make a second determination that the second prefetch buffer has completely loaded the second subset of transactions, wherein an initial transaction of the second subset of transactions corresponds to a first individual sequence ID; and
based at least in part on the second determination, commence replay of the second subset of transactions to the new instance immediately subsequent to completing replay of a particular transaction that corresponds to a second individual sequence ID that immediately precedes the first individual sequence ID.

18. The computer-readable storage medium of claim 16, wherein the computer-executable instructions further cause the one or more processors to cause the first prefetch buffer to load a third subset of transactions that is subsequent to the second subset of transactions based at least in part on a second determination that the first subset of transactions has been completely replayed to the new instance of the partition.

19. The computer-readable storage medium of claim 18, wherein the second subset of transactions is immediately subsequent to the first subset of transactions, and wherein the plurality of intervening subsets of transactions separate the third subset of transactions from the second subset of transactions.

20. The computer-readable storage medium of claim 16, wherein the computer-executable instructions further cause the one or more processors to:
   determine transaction replica distributions associated replications of the plurality of transactions stored across the plurality of stream nodes; and
   generate a plurality of read instructions based at least in part on the transaction replica distributions.

* * * * *